(12) United States Patent
Syukri

(10) Patent No.: US 6,771,279 B2
(45) Date of Patent: Aug. 3, 2004

(54) AUTOMATED SCROLLING CONTROL UNIT AND AUTOMATED SCROLLING CONTROL SYSTEM

(75) Inventor: Agus Fanar Syukri, Tokyo (JP)

(73) Assignee: NEC Corporation, Tokyo (JP)

( * ) Notice: Subject to any disclaimer, the term of this patent is extended or adjusted under 35 U.S.C. 154(b) by 91 days.

(21) Appl. No.: 09/947,417

(22) Filed: Sep. 5, 2001

(65) Prior Publication Data

US 2002/0027565 A1 Mar. 7, 2002

(30) Foreign Application Priority Data

Sep. 7, 2000  (JP) ........................................ 2000-271841

(51) Int. Cl.[7] ................................................. G09G 5/00
(52) U.S. Cl. ........................ 345/684; 345/685; 345/785
(58) Field of Search ................................ 345/684, 685, 345/686, 687, 785

(56) References Cited

U.S. PATENT DOCUMENTS 4,952,927 A  *  8/1990  DeLuca et al. ......... 340/825.44
5,339,391 A  *  8/1994  Wroblewski et al. ....... 345/786
5,774,109 A  *  6/1998  Winksy et al. .............. 345/684
6,201,526 B1 *  3/2001  Burgan ....................... 345/685

FOREIGN PATENT DOCUMENTS

| JP | 5-323941 | 12/1993 |
| JP | 9-74390 | 3/1997 |
| JP | 2001-184152 | 7/2001 |

OTHER PUBLICATIONS

Copy of Japanese Office Action dated Oct. 30, 2003 (and English translation of relevant portion).

* cited by examiner

*Primary Examiner*—Matthew Luu
(74) *Attorney, Agent, or Firm*—Dickstein, Shapiro, Morin & Oshinsky, LLP

(57) ABSTRACT

An automated scrolling control unit comprises a table section 23 that causes a keyword and a scrolling speed to correspond, an acquisition section 19 that retrieves the keyword from contents, and a display section 22 that displays the contents by scrolling at a scrolling speed that corresponded to the keyword retrieved based on the table section 23. The table section 23 causes the keyword, which is included in the contents that are frequently displayed, and the scrolling speed, at which a user can read easily, to correspond.

10 Claims, 23 Drawing Sheets

| KEYWORD | AUTOMATED SCROLLING SPEED VALUE |
|---|---|
| KEYWORD u1 | V1 |
| KEYWORD u2 | V2 |
| KEYWORD u3 | V3 |
| KEYWORD u4 | V4 |
| ... | ... |

23

| KEYWORD | AUTOMATED SCROLLING SPEED VALUE |
|---|---|
| KEYWORD u1 | V1 |
| KEYWORD u2 | V2 |
| KEYWORD u3 | V3 |
| KEYWORD u4 | V4 |
| ... | ... |

| URL ADDRESS | KEYWORD |
|---|---|
| http://www.aaa.com | KEYWORD a1, KEYWORD a2 |
| http://www.bbb.net | KEYWORD b1 |
| http://www.ccc.org | KEYWORD c1, KEYWORD c2, KEYWORD c3 |
| http://www.ddd.edu | KEYWORD d1, KEYWORD d2 |
| ... | ... |

| USER | URL ADDRESS | ACCESS NUMBER OF TIMES |
|---|---|---|
| USER A | http://www.aaa.com | 2 TIMES |
| | http://www.bbb.net | 1 TIMES |
| | ... | ... |
| USER B | http://www.aaa.com | 1 TIMES |
| | http://www.ccc.org | 2 TIMES |
| | ... | ... |
| USER C | http://www.ddd.org | 1 TIMES |
| | http://www.eee.org | 1 TIMES |
| | ... | ... |
| ... | ... | ... |

| USER | KEYWORD | |
|---|---|---|
| USER A | KEYWORD ua1 |  44 |
| | KEYWORD ua2 | |
| | ... | |
| USER B | KEYWORD ub1 | |
| | KEYWORD ub2 | |
| | ... | |
| USER C | KEYWORD uc1 | |
| | KEYWORD uc2 | |
| | ... | |
| ... | ... | |

AUTOMATED SCROLLING CONTROL UNIT AND AUTOMATED SCROLLING CONTROL SYSTEM

BACKGROUND OF THE INVENTION

The present invention relates to an automated scrolling control unit and an automated scrolling control system, and more particularly, to an automated scrolling control unit and an automated scrolling control system that display contents by scrolling in such a way that a user can read easily.

When an information display terminal displays contents (information) on a screen, it displays as one page portion the volume that can be displayed on one screen of an indicator, and when the remainder of the contents, which is not displayed, is present, it scrolls its contents to display. After the contents, which was being currently displayed on one screen, was read, in order to scroll the next screen, an operation such as pushing a button by a user and so forth are required. For this reason, when a large volume of information is received, it takes time to read it.

The scrolling display for automatically scrolling the contents is known. The scrolling control unit is also known that controls a scrolling speed of displaying the contents by scrolling according to the speed at which a user reads the contents. The scrolling control unit disclosed in JP-A-No.323941/1993, as shown in FIG. 23, comprises a central processing unit 101, a program work memory 102, a working memory 103, an input unit 104, a timer unit 105, a text work memory 106, an image work memory 107, a character generator 108, a display control unit 109 and an indicator 110.

When information displayed on the screen is character information, by making the scrolling speed variable according to the number of the characters, and when it is graphic information, by pre-storing a scrolling stop time associated with the graphic information and taking a variable control of the scrolling speed responding hereto, its problem has been solved. Namely, the scrolling speed has been determined based on the relation that the speed at which the user reads the characters is inversely proportional to the number of the characters being displayed, the speed, at which the user reads charts and images, has been pre-stored in connection with this information together, and the scrolling speed has been determined based thereon when displayed.

SUMMARY OF THE INVENTION

Accordingly, the objective of the present invention is to solve the above-mentioned tasks.

Moreover, the objective of the present invention is to provide an automated scrolling control unit and an automated scrolling control system that automatically adjust the scrolling speed to the speed at which the user can read easily.

Sections for solving the tasks are expressed as follows. To technical matters, which come out in its expression, were attached numbers, symbols and so forth with parentheses ( ). Their numbers and symbols and so forth accord with reference numbers, reference symbols and so forth that were appended to the technical matters constituting at least one embodiment or plural examples out of plural embodiments and plural examples of the present invention, particularly to the technical matters that were described in drawings which correspond to the embodiment or the example thereof. Such reference numbers and reference symbols clarify correspondence/mediation between the technical matters of claims and that of the embodiments or the examples. Such correspondence/mediation does not mean that the technical matters of claims are limited to the embodiments or the examples to construe.

The automated scrolling control unit in accordance with the present invention includes a table section (23) that causes a keyword and a scrolling speed to correspond, an acquisition section (19) that retrieves the keyword from contents, and a display section (22) that displays the contents by scrolling at the scrolling speed that corresponded to the keyword retrieved based on the table sections. The scrolling speed at which the contents are scrolled automatically is preferably controlled by whether or not the user is interested in its the contents. The table section (23) causes the keyword, which is included in the contents being frequently displayed, to correspond to the scrolling speed at which the user can read easily.

Further is included a display control section (21) that updates the table section (23) when the scrolling speed was altered by the user while the display section (22) displayed the contents by scrolling. The scrolling speed at which the user can read easily is preferably updated at the moment when the contents are being automatically displayed by scrolling. The scrolling speed altered by the user is updated into the table section (23) as it is, or a function of the altered scrolling speed is updated into the table section (23).

When the keyword is not included in the contents, the display section (22) displays the contents by scrolling at the speed that is set up based on the number of characters being displayed on the display section. It is known that the scrolling speed is set up based on the number of characters being displayed. Such a scrolling display is better than that the scrolling display is not carried out automatically for the reason that the keyword is not included.

The automated scrolling control system in accordance with the present invention includes an information terminal (1) and a server (2) that provides the contents to the information terminal (1), the server (2), which includes a first table (42) that causes the contents and the keyword to correspond, provides to the information terminal (1) the keyword that corresponded to the contents based on the first table (42), and the information terminal (1) includes a second table section (23) that causes the keyword provided from the server (2) and the scrolling speed to correspond, an acquisition section (19) that retrieves the keyword from the contents, and a display section (22) that displays the contents by scrolling at the scrolling speed that corresponded to the retrieved keyword. Such a first table (42) is known, and is used for retrieving the contents and so forth. The keyword, which the second table (23) possesses, is provided from the server (2), and the user does not need to set up the keyword.

The server (2), which further includes a third table section that indicates the number of times which the information terminal (1) requested the contents at a predetermined period, does not provide the keyword to the information terminal (1) when the number of times is below the predetermined number of times. The keyword, which is provided to the information terminal (1), is regarded as the keyword in which the user is interested.

The server (2), which further includes a fabrication section that adds the keyword to the contents, provides to the information terminal (1) the contents to which the keyword was added. Such an addition can decrease the number of communication between the server (2) and the information terminal (1). At this moment, an acquisition section (19) of the information terminal (1) does not need to retrieve the added keyword and to retrieve the keyword from the contents.

The server (2), which further includes a forth table (44) that causes the information terminal (1) and the keyword, which the second table (23) belonging to the information terminal (1) possesses, to correspond, preferably dos not provide the keyword to the information terminal (1) when the keyword that corresponds to the contents is not present in the fourth table (44). The acquisition section (19) of the information terminal (1) can retrieve further easily.

BRIEF DESCRIPTION OF THE DRAWING

This and other objects, features and advantages of the present invention will become more apparent upon a reading of the following detailed description and drawings, in which:

FIG. 7 is a table illustrating one example of a URL verses keyword table 42;

DESCRIPTION OF THE EMBODIMENTS

Figure 1:
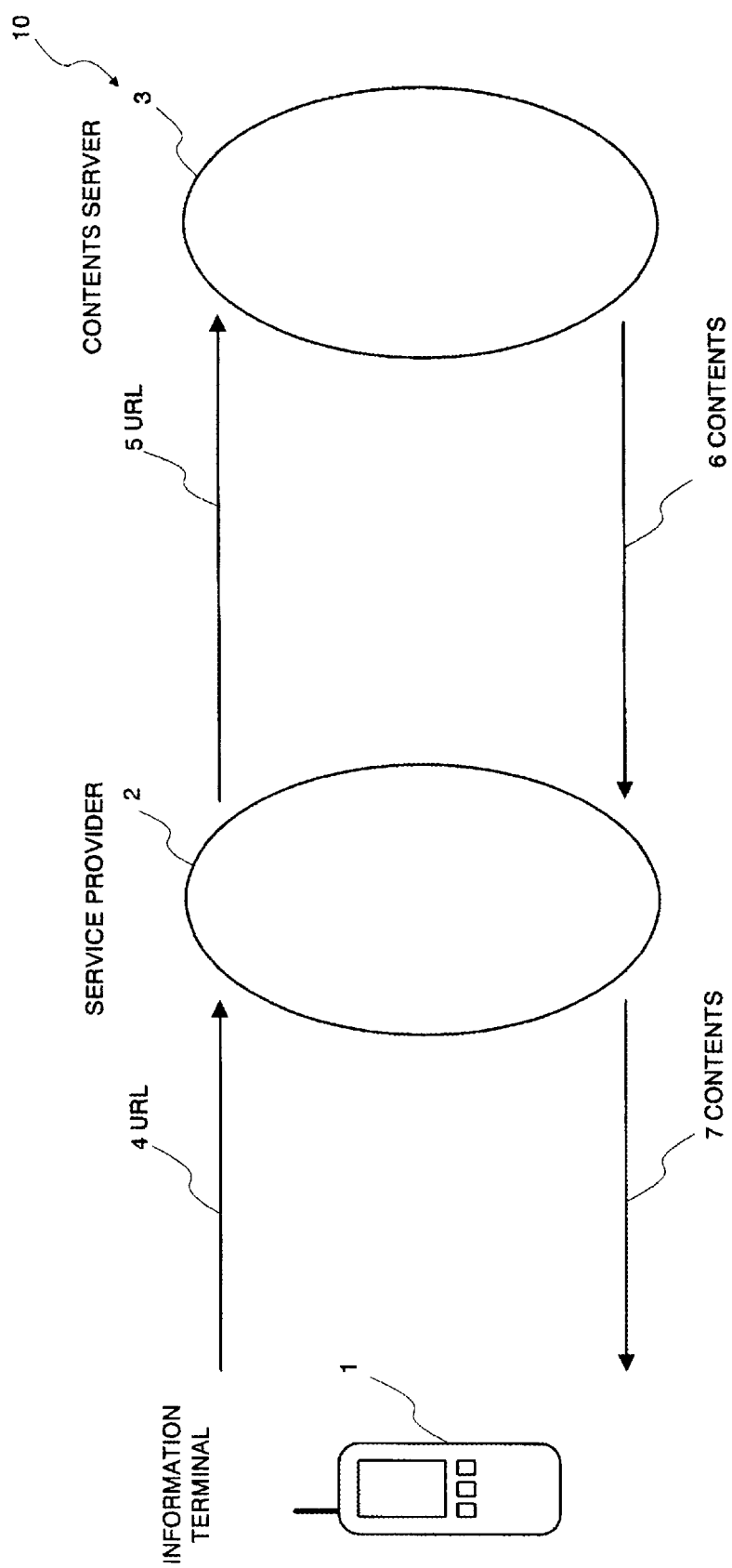
FIG. 1 is a block diagram illustrating an embodiment of an automated scrolling control system in accordance with the present invention.

Referring to the accompanied drawings, in an embodiment of an automated scrolling control system in accordance with the present invention, an information terminal is provided together with a service provider. Its information terminal 1, as shown in FIG. 1, is connected to a service provider 2 via a wireless or a wire networks that a network or a public circuit network exemplifies. An automated scrolling control system 10 further comprises a contents server 3. The service provider 2 is connected to the contents server 3 via the wireless or the wire networks.

The information terminal 1 transmits a URL 4 to the service provider 2. The URL 4 does not mean only the URL of the internet, but as long as it indicates position of the contents over the network, whatever the URL, it does not matter. The service provider 2 has a proxy function. The service provider 2 transfers a URL access request 5 to the contents server 3. The contents server 3, which includes a memory medium that a memory and a hard disc exemplify, provides to the information terminal 1 the contents recorded in the memory medium via the service provider 2. The contents server 3 transmits to the service provider 2 corresponding contents 6 in response to the URL access request. The service provider 2 transfers contents 7 to the information terminal 1.

Figure 2:
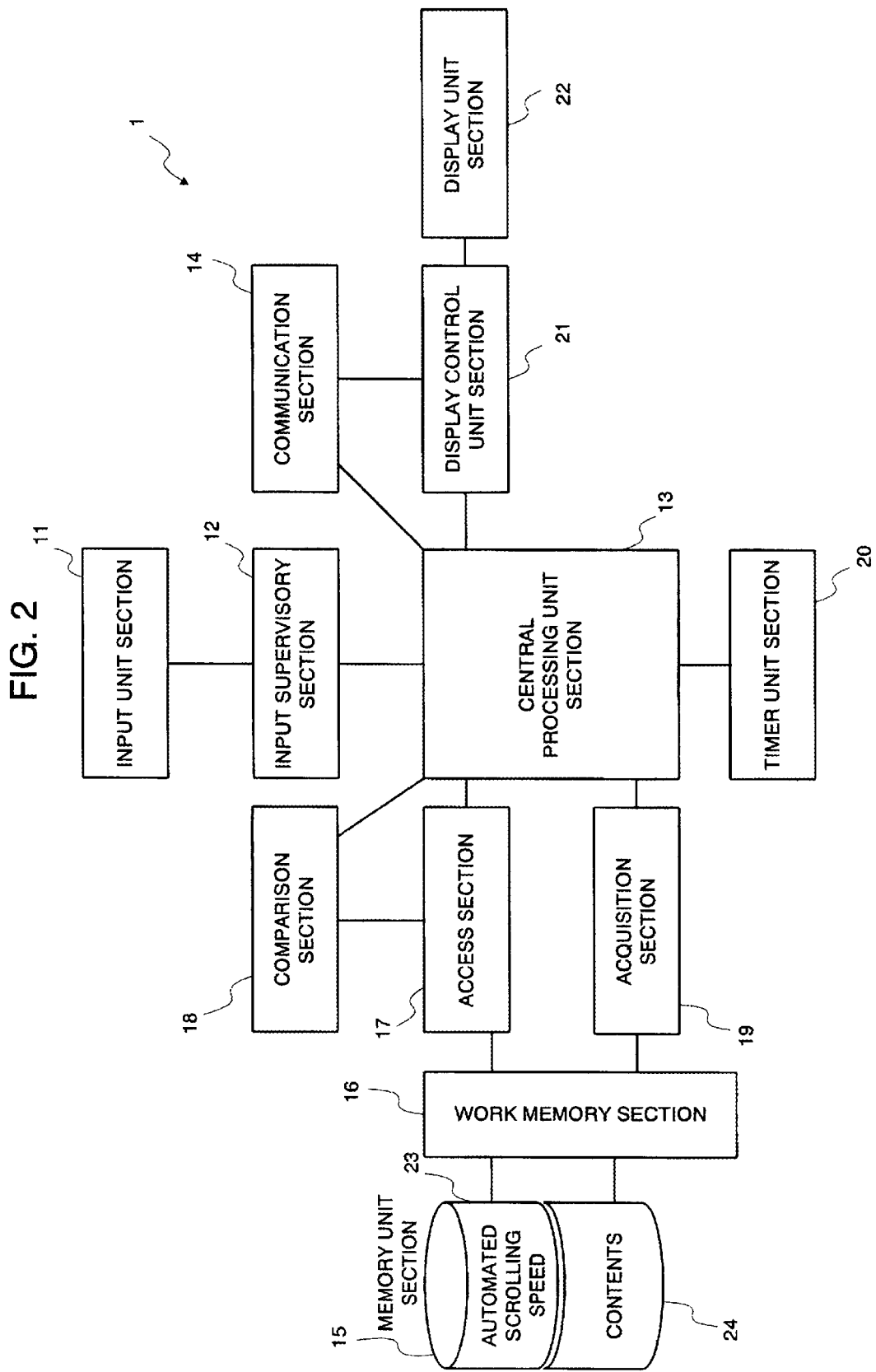
FIG. 2 is a block diagram illustrating an information terminal 1.

FIG. 2 illustrates the information terminal 1 in details. The information terminal 1, as shown in FIG. 2, comprises an input unit section 11, an input supervisory section 12, a central processing unit section 13, a communication section 14, a memory unit section 15, a work memory 16, an access section 17, a comparison section 18, an acquisition section 19, a timer unit section 20, a display control unit section 21, and a display unit section 22.

The central processing unit section 13 is connected to the input supervisory section 12, the access section 17, the comparison section 18, the acquisition section 19, the communication section 14, the timer unit section 20, and the display control unit section 21 via a bus. The central processing unit section 13 controls a process that is performed in the entirety of the information terminal 1.

The input unit section 11 is a unit for the user inputting display control commands into the information terminal 1. The display control command consists of two commands. One command of them is for control of starting and aborting an automated scrolling function of the information terminal 1. The other is for controlling so as to scroll the screen, on which the contents are displayed, in up/down directions or right/left directions.

The input supervisory section 12 supervises whether or not the display control command is input from the input unit section 11. When the display control command was input, the input supervisory section 12 notifies via the central processing unit section 13 the display control unit section 21 of its display control command that was input.

The communication section 14, which is an interface part between the information terminal 1 and the network, communicates with the service provider 2. The memory unit section 15 stores the automated scrolling speed table 23 and the contents 24. The automated scrolling speed table 23 causes the keyword and the automated scrolling speed value to correspond.

The work memory 16 temporarily stores an executive program that is executed in the central processing unit section 13, and temporarily stores the contents. The access section 17 reads out contents of the automated scrolling speed table 23, and updates the automated scrolling speed table 23.

The comparison section 18 obtains the automated scrolling speed value from the automated scrolling speed table 23 via the access section 17, and obtains the automated scrolling speed value from the display control unit section 21. The comparison section 18 compares the two automated scrolling speed values that were obtained, and when the automated scrolling speed value obtained from the display control unit section 21 is within an alteration range that was set, it writes the average of the two automated scrolling speed values into the automated scrolling speed table 23.

The acquisition section 19 reads out contents of the contents 24 stored in the memory unit section 15, and retrieves whether or not the keyword stored in the automated scrolling speed table 23 is present. The timer unit section 20 measures the time set up by the central processing unit 13, and outputs a time-up signal to the central processing unit 13 at the same time that the measurement finishes.

The display control unit section 21 obtains the automated scrolling speed value from the automated scrolling speed table 23 via the central processing unit 13 and the access section 17. The display control unit section 21 outputs the contents to the display unit section 22 at the scrolling speed based on its automated scrolling speed value. Furthermore, when the display control unit section 21 received from the input supervisory section 12 the display control command indicating starting of the automated scrolling function, by utilizing the time unit section 20 via the central processing unit section 13, it obtains the time that the up/down-direction or the left/right-direction scrolling button 27 is pushed down since the contents were displayed on the display screen 25.

The display unit section 22, which includes the display screen 25, displays the contents on the display screen 25 by the display control unit section 21's instruction.

Figure 3:
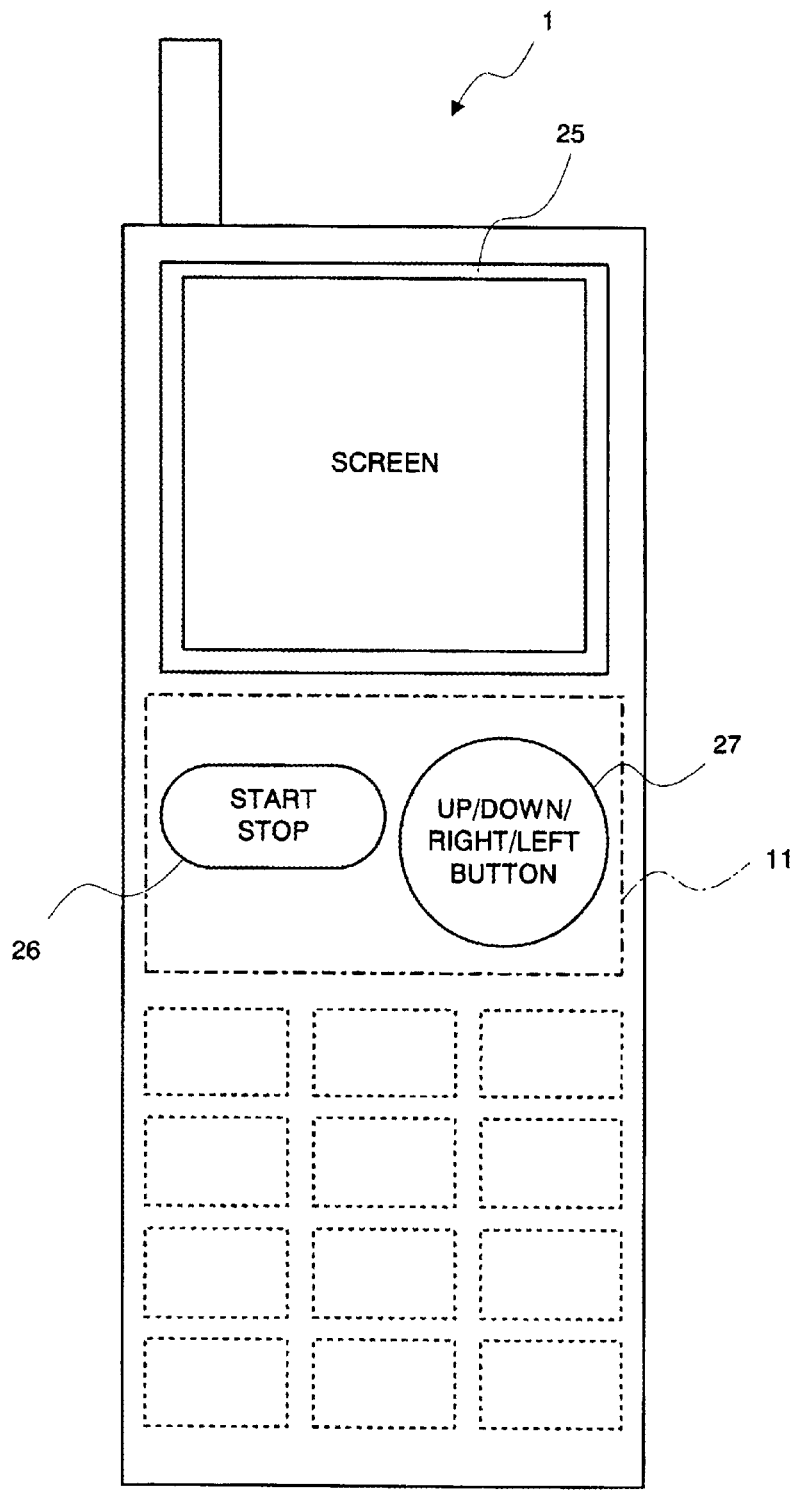
FIG. 3 is a floor plan illustrating an appearance of an information terminal 1.

FIG. 3 illustrates one example of an appearance of the information terminal 1. The information terminal 1, which a mobile telephone exemplifies as shown in FIG. 3, comprises the input unit section 11 and the display screen 25 on the surface thereof. The input unit section 11 comprises an automated scrolling button 26 and an up/down/left/right-direction scrolling button 27. The automated scrolling button 26 outputs the command for starting or aborting the automated scrolling function. The up/down/left/right-direction scrolling button 27, which consists of a plurality of button switches that correspond to up/down directions or to left/right directions, outputs the command, in the direction of which the contents are scrolled.

Figure 4:
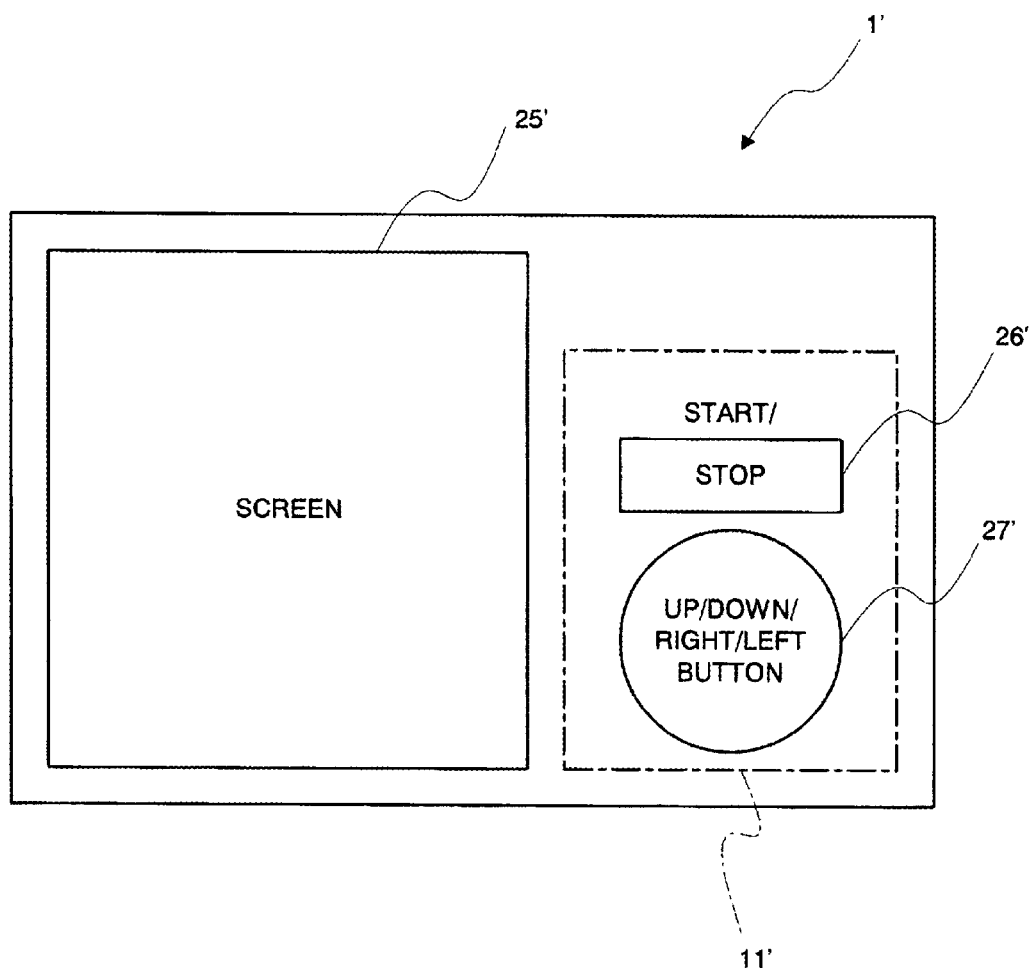
FIG. 4 is a floor plan illustrating an appearance of an information terminal 1'.

FIG. 4 illustrates another example of an appearance of the information terminal 1. An information terminal 1', as shown in FIG. 4, comprises an input unit section 11' and a display screen 25' in same manner to the example of FIG. 3. The input unit section 11' comprises an automated scrolling button 26' and an up/down/left/right-direction scrolling button 27'. Additionally, if the input unit section 11 is an input unit into which the user can input the display control command, it does not matter that it is not a button-switch type.

Figure 5:
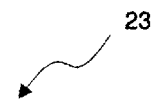
FIG. 5 is a table illustrating one example of an automated scrolling speed table 23.

FIG. 5 illustrates the automated scrolling speed table 23. The automated scrolling speed table 23, as shown in FIG. 5, causes the keyword and the automated scrolling speed value to correspond one for one.

Figure 6:
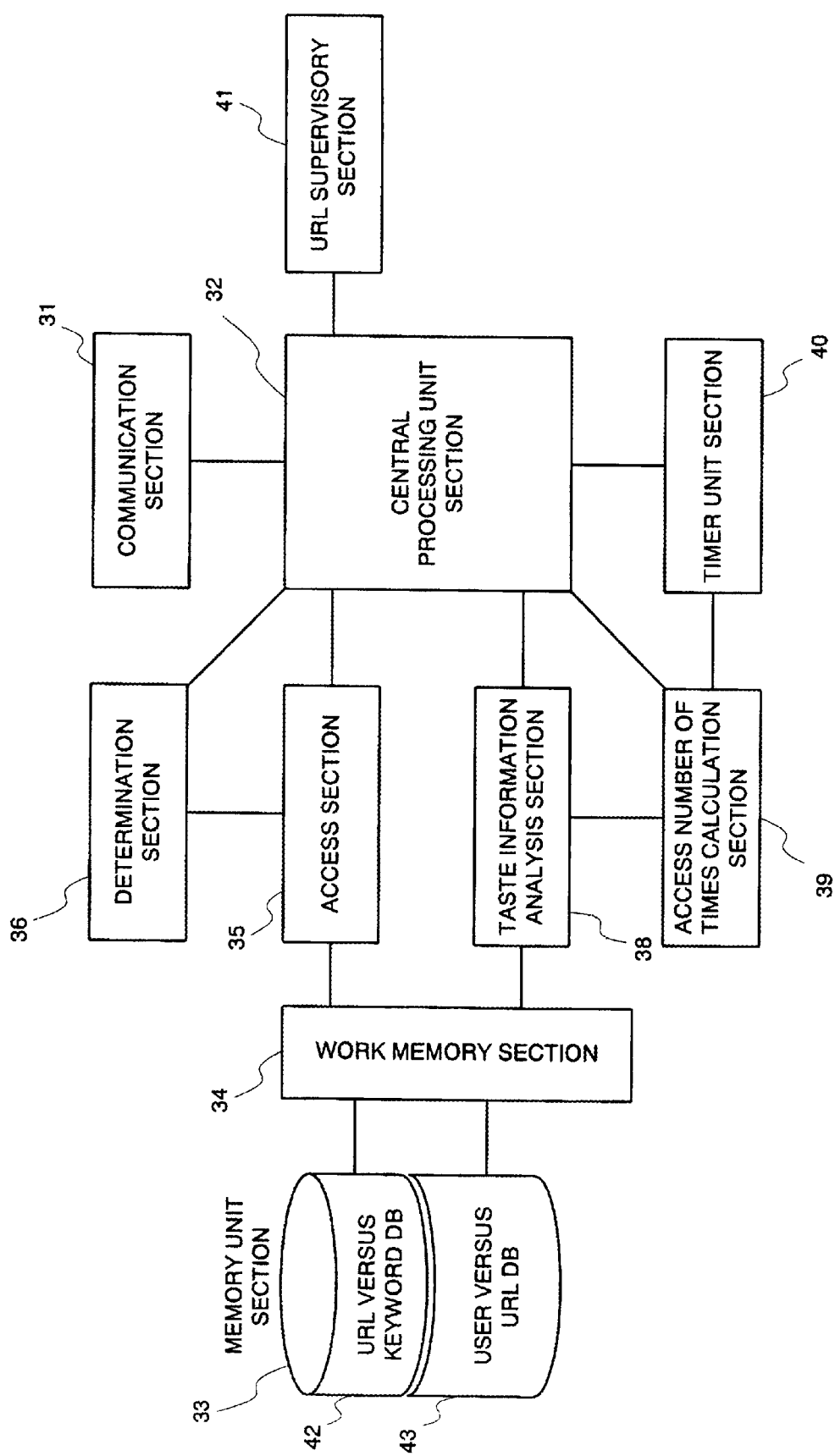
FIG. 6 is a block diagram illustrating a service provider 2.

FIG. 6 illustrates the service provider 2 in details. The service provider 2, as shown in FIG. 6, is constructed of a communication section 31, a central processing unit section 32, a memory unit section 33, a work memory section 34, an access section 35, a determination section 36, a taste information analysis section 38, an access number of times calculation section 39, a timer unit section 40, and a URL supervisory section 41.

The central processing unit section 32 is connected to the communication section 31, the access section 35, the determination section 36, the taste information analysis section 38, the access number of times calculation section 39, the timer unit section 40, and the URL supervisory section 41 via a bus. The central processing unit section 32 controls a process that is performed by the service provider 2.

The communication section 31, which is an interface part between the service provider 2 and the network, communicate with the information terminal 1. The memory unit section 33 stores a URL versus keyword table 42 and a user versus URL table 43. The URL versus keyword table 42 causes the URL and the keyword to correspond. The user versus URL table 43 indicates how many times each user accesses which URL.

The work memory section 34 temporarily stores an executive program that is executed by the central processing unit section 32, and temporarily stores the contents to be transmitted to the information terminal 1. The access section 35 reads out via the work memory section 34 the contents of the URL versus keyword table 42 and the user versus URL table 43 that are stored in the memory unit section 33, and updates the URL versus keyword table 42 and the user versus URL table 43.

In response to the information terminal 1's access request, the determination section 36 reads out information of the user versus URL table 43 via the access section 35, and determines whether or not information of the information terminal 1 is present in the user versus URL table 43. The determination section 36 further determines whether or not the URL for which the information terminal 1 made the access request, which corresponds to the information terminal 1, is present, and determines whether the number of times, which the information terminal 1 accessed its URL, is more than or below the predetermined number of times.

The taste information analysis section 38 supervises the number of times which the user accessed the URL, and instructs the access section 35 to update the user versus URL table 43. When the number of times of the access that corresponds to one URL exceeded the pre-set number of times of the access, the taste information analysis section 38 obtains the keyword that corresponds to its URL from the URL versus keyword table 42, and transmits its keyword to the information terminal 1. The access number of times calculation section 39 calculates the number of times that the user accessed for a predetermined period.

The timer unit 40 measures the time set up by the central processing unit section 32, and outputs a time-up signal to the access number of times calculation section 39 at the same time that measurement finishes. The timer unit 40 starts the time measurement by the central processing unit section 32's instruction, and outputs the time-up signal to the access number of times calculation section 39 at the same time that the measurement finishes. The URL supervisory section 41 accesses the contents server 3 in response to the information terminal 1's URL access request, and obtains the contents. Furthermore, it supervises this information.

Figure 8:
FIG. 8 is a table illustrating one example of a user verses URL table 43.

A table of FIG. 7 illustrates the URL versus keyword table 42. The URL versus keyword table 42, as shown in the table of FIG. 7, causes the URL and the keyword to correspond. A table of FIG. 8 illustrates the user versus URL table 43. The user versus URL table 43, as shown in the table of FIG. 8, illustrates which URL each user accessed, and illustrates how many number of times each user accessed which URL.

Figure 9:
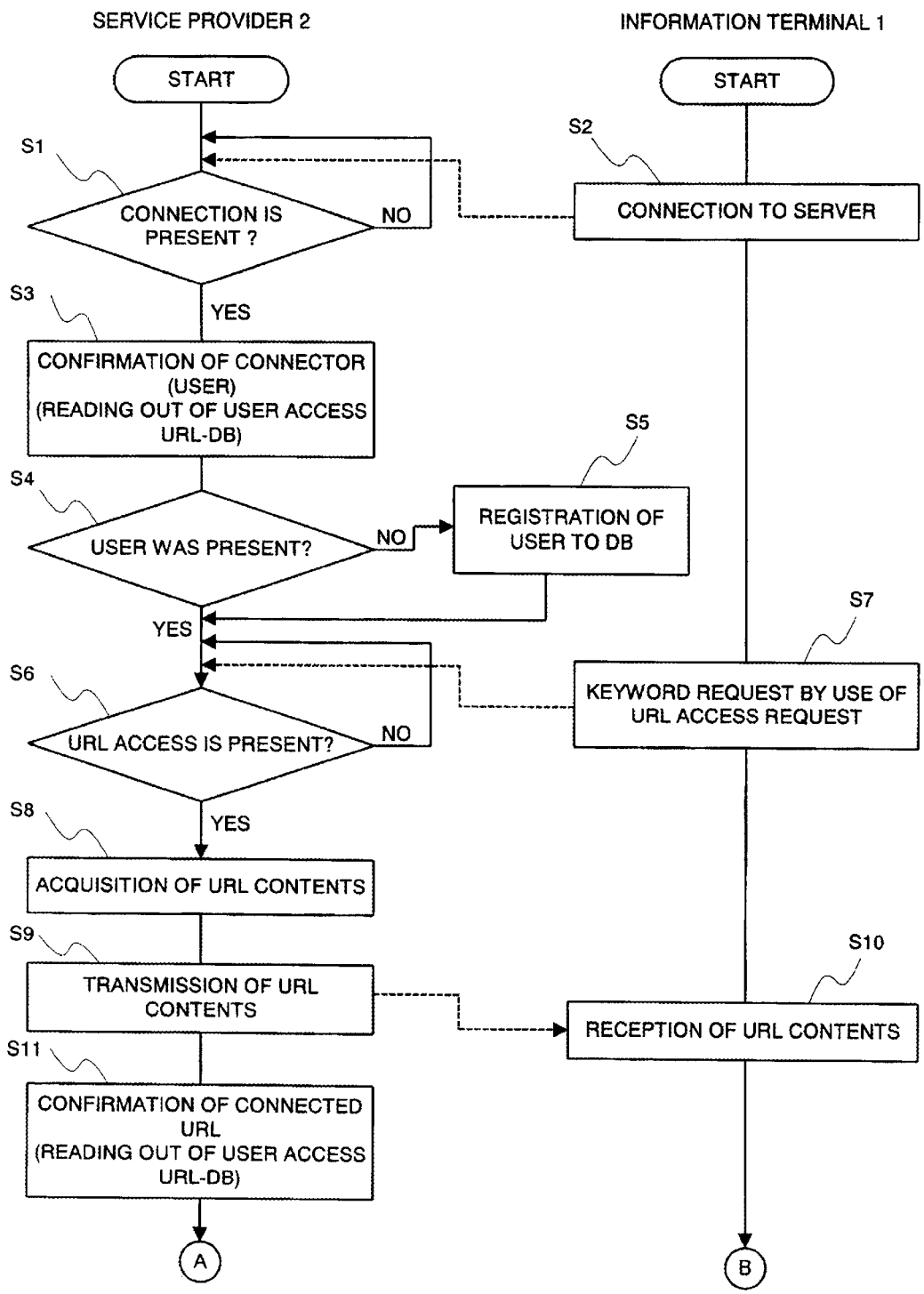
FIG. 9 is a flowchart illustrating an operation of an automated scrolling control system.
Figure 10:
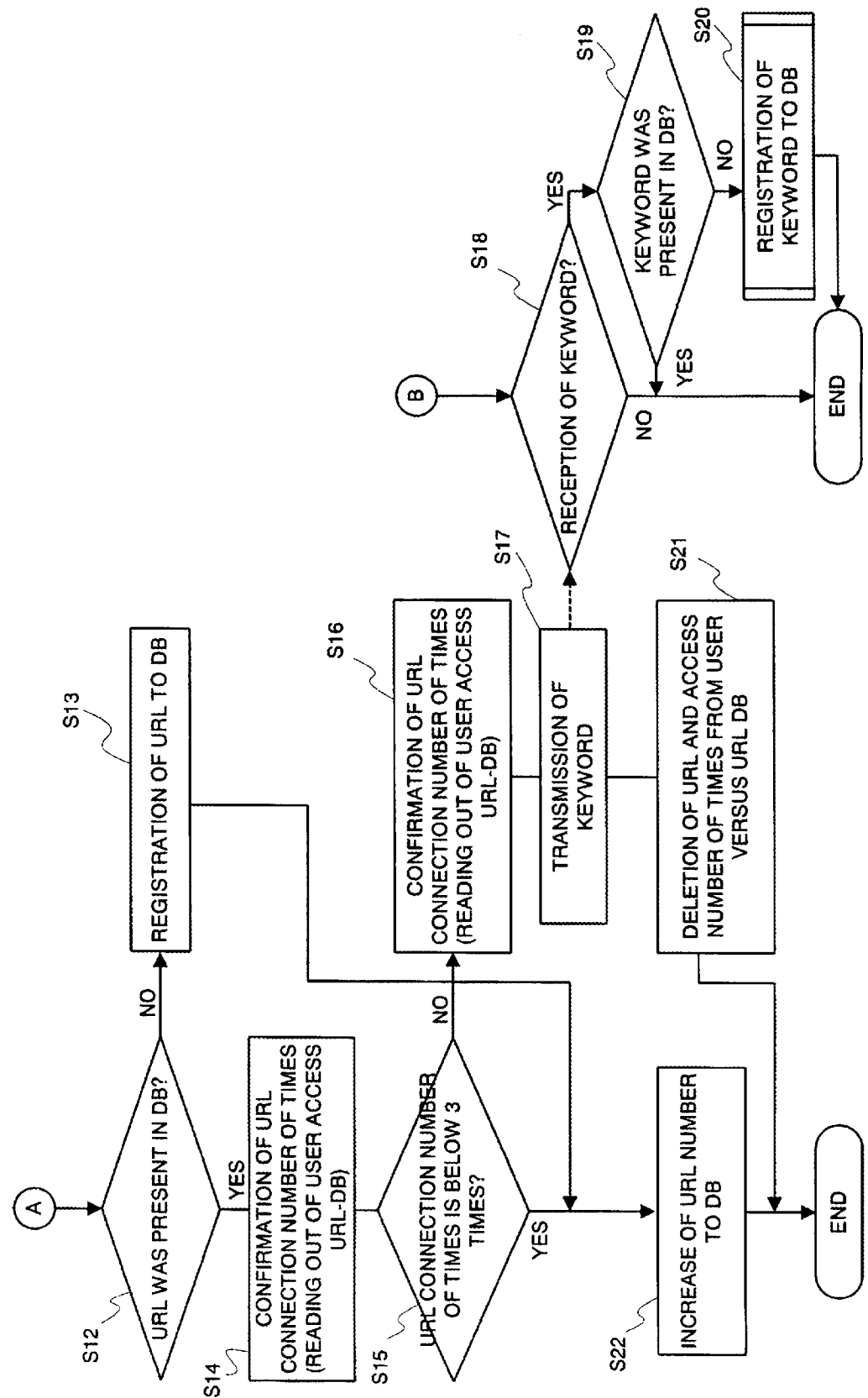
FIG. 10 is a flowchart illustrating an operation of an automated scrolling control system.

FIG. 9 and FIG. 10 illustrate the operation of the automated scrolling control system 10. Firstly, the service provider 2 determines via the communication section 31 whether or not the information terminal 1's connection request is present (step S1). When the information terminal 1's connection request is not present, the service provider 2 enters a loop in which is repeated the process of determining whether or not the information terminal 1's connection request is present. When the information terminal 1's connection request was received, the service provider 2 gets out of its loop, and reads out the user versus URL table 43 of the memory unit section 33 via the access section 35 (step S3).

Based on the user versus URL table 43, the determination section 36 determines whether or not information indicating the information terminal 1, which made the connection request, is present in the user versus URL table 43 (step S4). When information indicating the information terminal 1 is not present in the user versus URL table 43, information, which newly indicates the information terminal 1, is registered to the user versus URL table 43 (step S5). When information indicating the information terminal 1 is present in the user versus URL table 43, or after the step S5 was executed, the service provider 2 determines whether or not the information terminal 1 is making the keyword request, which is a special command, together with the URL request (step S6).

When the information terminal 1's URL access request is not present, the service provider 2 executes the loop in which is repeated the process (step S6) of determining whether or not the URL access request is present. When the service provider 2 received the URL access request and the keyword request from the information terminal 1, it gets out of its loop to obtain the URL contents from the contents server 3 via the URL supervisory section 41 (step S8).

The service provider 2 transmits its URL contents to the information terminal 1 (step S9). The determination section 36 instructs the access section 35 to read out the user versus URL table 43 (step S11). The determination section 36 determines whether or not the URL accessed from the information terminal 1 was present in the user versus URL table 43 (step S12).

When information of the URL accessed from the information terminal 1 is not present, the URL, which was newly accessed, is registered to the user versus URL table 43 (step S13). When information of the accessed URL is present in the user versus URL table 43, the access number of its URL is read out from the user versus URL table 43 and is delivered to the determination section 36 (step S14).

The determination section 36 determines whether the access, of which the number is more than the predetermined number, is present within a predetermined period (step S15). When the access, of which the number is more than the predetermined number, is present, the taste information analysis section 38 obtains from the URL versus keyword table 42 the keyword that corresponds to the URL that the user requested (step S16). The taste information analysis section 38 transmits its keyword to the user's information terminal 1 via the communication section 31 (step S17). The taste information analysis section 38 erases information of the accessed URL and its access number from the user record of the user versus URL table 43 (step S21).

When it is below the number conditions, or after the process of the step 13 was performed, the access section 35 updates the user versus URL table 43. Namely, to the URL access number of the accessed URL is added only one (Step 22).

The information terminal 1, firstly, transmits the connection request to the service provider 2 (step S2), and transmits the URL connection request to the service provider 2 (step S7). Then, the information terminal 1 receives the URL contents from the service provider 2 (step S10), records its URL contents as the contents 24 in the memory unit section 15. The information terminal 1 further determines whether or not the keyword is received (step S18).

When the information terminal 1 received the keyword (step S18; YES), it is determined whether the received keyword is present in the automated scrolling speed table 23 (step S19). When its keyword is not present in the automated scrolling speed table 23, its keyword is registered as a new keyword to the automated scrolling speed table 23 (step S20).

Figure 11:
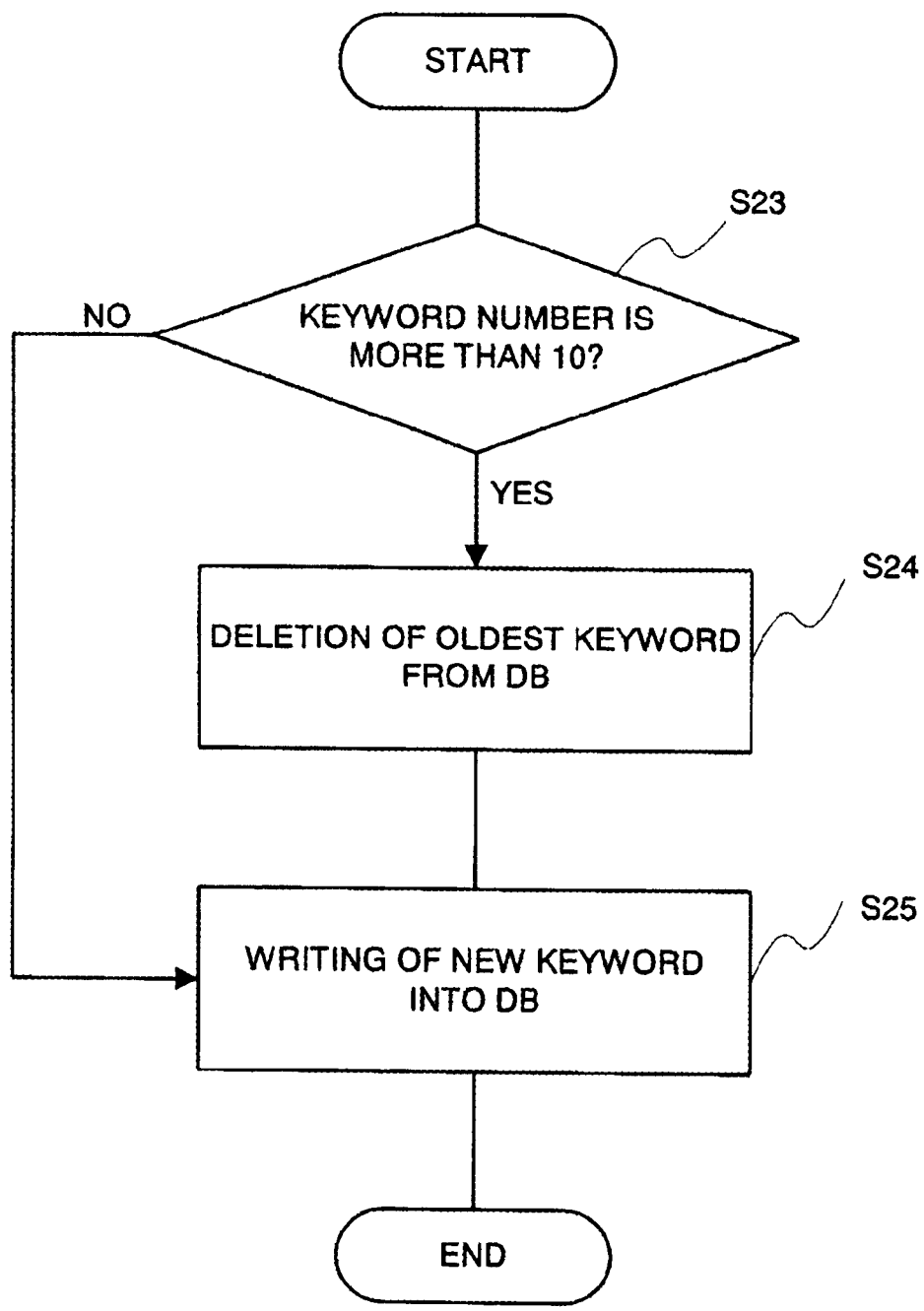
FIG. 11 is a flowchart illustrating an operation of registering a keyword to an automated scrolling speed table.

FIG. 11 illustrates the process of the step S20 in details, namely, the operation of performing the process for registering the new keyword to the automated scrolling speed table 23. When the keyword received from the service provider 2 is not present in the automated scrolling speed table 23, this flow starts. At first, the access section 17 determines whether or not the keyword of which the number is more than the predetermined number, which includes the new keyword, is present in the automated scrolling speed table 23 (step S23).

When the number of the registered keywords is more than the predetermined number, the access section 17 erases the oldest keyword from the automated scrolling speed table 23 (step S24). When the number of the registered keywords is below the predetermined number, or after the process of the step 24 was executed, the access section 17 registered the new keyword to the automated scrolling speed table 23 (step S25). Additionally, the number of the keywords that can be registered in the automated scrolling speed table 23 is to be the number that can be set up by the user. In the present embodiment, the automated scrolling speed table 23 stores a maximum of 10 keywords.

Figure 12:
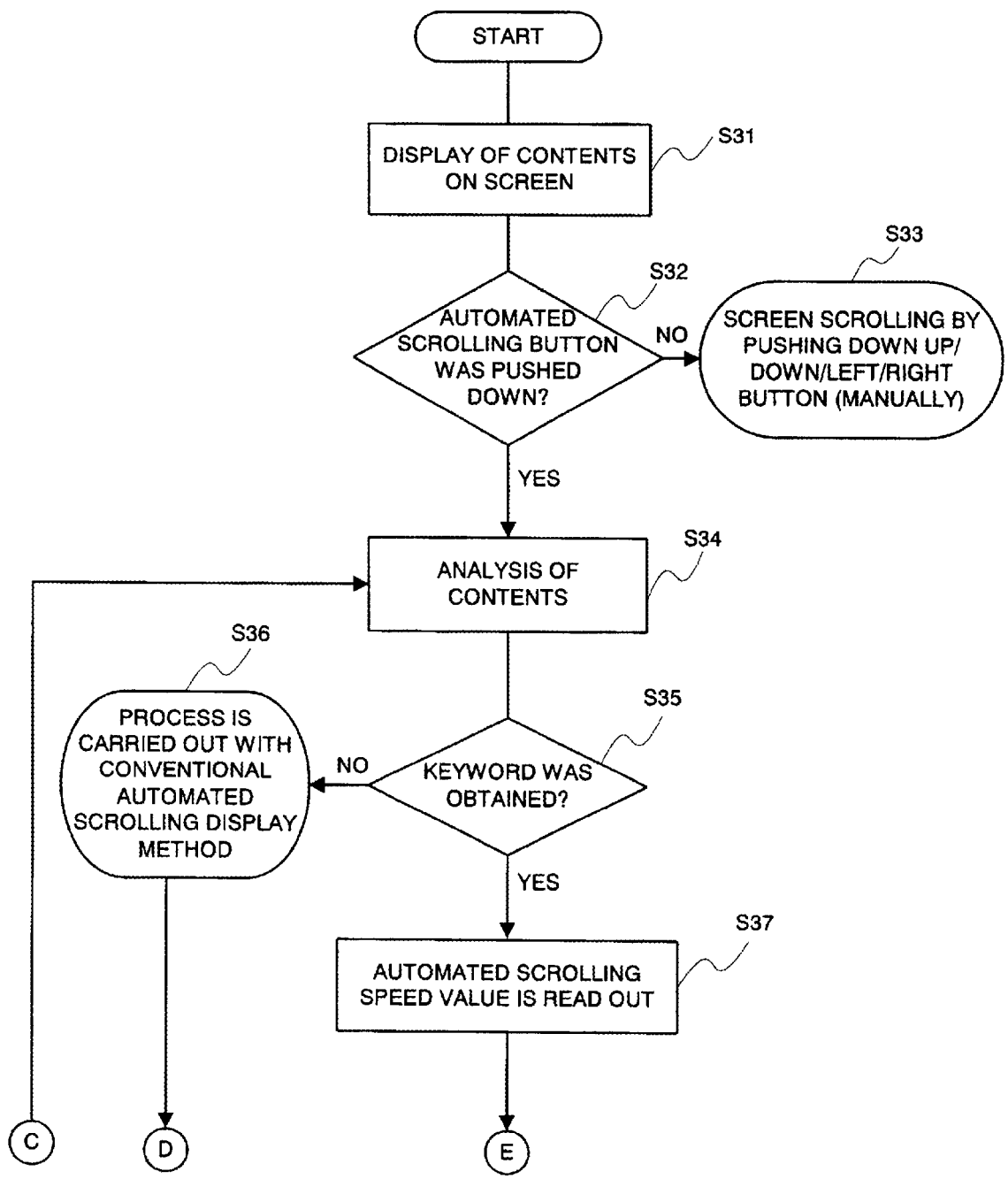
FIG. 12 is a flowchart illustrating an operation of an information terminal 1.
Figure 13:
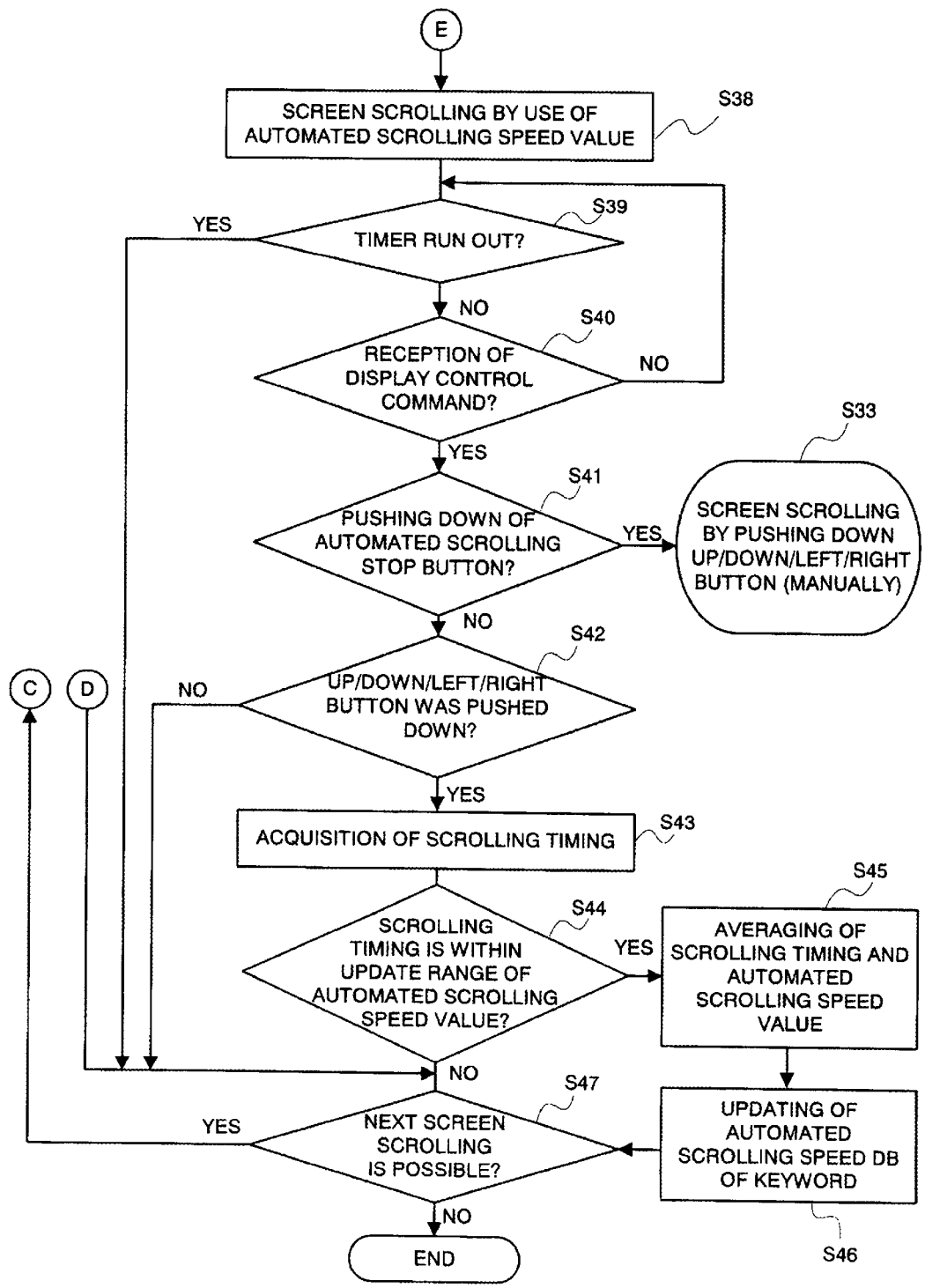
FIG. 13 is a flowchart illustrating an operation of an information terminal 1.

FIG. 12 and FIG. 13 illustrate the operation in which the information terminal 1 displays the contents by automated scrolling. When a power of the information terminal 1 is switched on by the user, the information terminal 1 starts a predetermined application, and displays on the display unit section 22 the contents 24 recorded in the memory unit section 15 (step S31). Or, the information terminal 1 displays on the display unit section 22 the contents recorded in the record medium, which a memory and a hard disc attached to the outside exemplify.

When the remainder of the contents, which is not displayed, is present in the display unit section 22, namely, the page of the contents is more than two, the input supervisory section 12 determines whether or not the automated scrolling button 26 of the input unit section 11 is pushed down (step S32). When the page of the contents to be displayed is below two, the flow finishes.

When the automated scrolling button 26 of the input unit section 11 was not pushed down, by the user adjusting and pushing down the up/down/left/right-direction scrolling button 27 to the desired direction of the display screen 25, the contents are scrolled in the up/down directions or in the left/right directions of the display screen 25 (step S33).

When the user pushed down the automated scrolling button 26, the input supervisory unit 12 notifies the display control unit section 21 that the control command indicating execution of the automated scrolling was received. Upon receiving the notification, the display control unit section 21 starts the automated scrolling display process. Next, the display control unit section 21 instructs the access section 17 to read out the contents 24 recorded in the record unit section 15 and the keyword recorded in the automated scrolling speed table 23 (step S34).

The access section 17 reads out the keyword of the automated scrolling speed table 23, and delivers its keyword to the acquisition section 19. The acquisition section 19 reads out the contents 24, and determines whether or not the keyword delivered from the access section 17 is included within the contents 24 (step S35).

When the keyword is not present within the contents 24, based on character information, image information and so forth that are displayed on the display screen 25, the information terminal 1 performs the automated scrolling display process (step S36). For example, when the contents are character information, it is scrolled at a speed adversely proportional to the character length of one line. Such a scrolling display is better than that the scrolling display is not carried out automatically for the reason that the keyword is not included.

When the keyword is present within the contents 24, the display control unit section 21 obtains via the central processing unit section 13 and the access section 17 the automated scrolling speed value that corresponds to the keyword of the automated scrolling speed table 23 (step S37). The display control unit section 21 notifies the display unit 21 so as to display the contents 24 on the display screen 25, and notifies of the automated scrolling speed value (step S38). The display unit section 22 receives the automated scrolling speed value and displays the contents 24 by automated scrolling. The central processing unit section 13 instructs the timer unit section 20 to measure the time that corresponds to the automated scrolling speed value.

The timer unit section 20 measures the time by the central processing unit section 13's instruction (step S39). When the contents is being displayed by automated scrolling in the display unit section 22, the display control unit section 21 notifies the input supervisory section 12 to determine whether or not the act of pushing down the automated scrolling button 26 of the input unit section 11 is present. The input supervisory section 12 determines whether or not the display control command is received from the user within the time of the automated scrolling display of the contents (step S40). Until the display time runs out, namely, until the timer unit section 20 outputs the time-up signal to the central processing unit section 13, the process is repeatedly performed of determining whether or not the display control command is received.

When the display control command was received, it is determined whether the pushed-down button is the automated scrolling button 26 or the up/down/left/right-direction scrolling button 27 (step S41 and S42). The display control unit section 21 is notified of the determination result.

When the automated scrolling button 26 was pushed down, the display control unit section 21 makes the automated scrolling display process finished, and by the user adjusting and pushing down the up/down/left/right-direction scrolling button 27 to the desired direction of the display screen 25, the contents is scrolled in the up/down directions or in the left/right directions of the display screen 25 (step S33).

When the up/down/left/right-direction scrolling button 27 was pushed down, the display control unit section 21 requests via the central processing unit section 13 the timer unit section 20 of the time that the up/down/left/right-direction scrolling button 27 is pushed down since the contents was displayed on the display screen 25. This time is set as a new scrolling speed value. The timer unit 20 notifies the display control unit section 21 of the new scrolling speed value (step S43). The display control unit section 21 delivers the new scrolling speed value to the comparison section 18 via the central processing unit section 13 and instructs a comparison between the conventional automated scrolling speed value and the new automated scrolling speed value (step S44).

When the new automated scrolling speed value is within an alteration range of the automated scrolling speed value, the comparison section 18 calculates an average of the new automated scrolling speed value and the automated scrolling speed value (step S45), and notifies the display control unit section 21 of the average. The display control unit section 21 inserts the average as the new automated scrolling speed value, and updates the automated scrolling speed value, which corresponds to the keyword within the automated scrolling speed table 23, to the new automated scrolling speed value (step S46).

It is regarded as the user being requesting an alteration in its automated scrolling speed that the up/down/left/right-direction scrolling button 27 is pushed down on the way, while the contents are displayed by automated scrolling. The new automated scrolling speed value that the user altered, as mention above, has been averaged and updated into the automated scrolling speed table 23, but it may be updated as it is. Averaging prevents an extreme alteration in the automated scrolling speed.

When the new automated scrolling speed value is not within the alteration range of the automated scrolling speed value, the display control unit section 21 instructs the acquisition section 19 to determine whether or not the remainder of the contents, which is displayed on the next display screen 25, is present. Setting up the alteration range in such a way prevents an extreme alteration in the automated scrolling speed.

The acquisition section 19 reads out the contents 24 stored in the record unit section 15, and determines whether or not the remainder of the contents to be displayed on the display screen 25 is present (step S47). The display control unit section 21 is notified of this determination result. When the remainder of the contents to be displayed is present, the step S34 is executed once again, and the display control unit section 21 performs the display process for its remainder of the contents on the display screen 25. When the remainder of the contents to be displayed is not present, the display control unit section 21 makes the automated scrolling display process finished.

When the timer unit section 20 output the time-up signal to the central processing unit section 13 (step S39; NO), the display control unit section 21 instructs the acquisition section 19 to determine whether or not the remainder of the contents, which are displayed on the next display screen 25, is present. The acquisition section 19 reads out the contents 24 stored in the record unit section 15, and determines whether or not the remainder of the contents, which are displayed on the display screen 25, is present (step S47). The display control unit section 21 is notified of this determination result. When the remainder of the contents to be displayed is present, the step S34 is executed once again, and the display control unit section 21 performs the display process for the remainder of the contents on the display screen 25. When the remainder of the contents to be displayed is not present, the display control unit section 21 makes the automated scrolling display process finished.

For example, when a user A makes the access request of URL "http://www.aaa.com" to the service provider 2 by use of the information terminal 1, it is determined whether or not the user A is present in the user versus URL table 43. When the user A is present in the user versus URL table 43, it is determined whether or not the URL, to which the access request was made, is present in the URLs that corresponds to the user A. When the URL is present, it is further determined whether or not the access number of times, which corresponds to its URL, is below three.

When the access number of times is more than three, the keywords, "keyword a1" and "keyword a2", which correspond to URL "http://www.aaa.com", are transmitted from the URL versus keyword table 42 to the user A's information terminal 1.

Figure 14:
FIG. 14 is a table illustrating one example of an automated scrolling speed table 23'.

After the information terminal 1 transmitted the URL access request to the service provider 2, it receives the URL contents from the service provider 2 and receives the keyword. In the present example, the service provider 2 transmits the "keyword a1" and the "keyword a2", and the automated scrolling speed table 23 is updated from a table shown in FIG. 5 into a table (automated scrolling speed table 23') shown in FIG. 14.

When the user A pushes down the automated scrolling button 26 during displaying of the contents, the automated scrolling display function starts. It is determined whether or not the keyword recorded in the automated scrolling speed table 23' is included within the contents.

When "keyword u2" was present within the contents, based on the automated scrolling speed value "V3", which corresponds to the "keyword u2", the contents is displayed by automated scrolling on the display screen 25 from the automated scrolling speed table 23'.

During the automated scrolling display, when the user A pushed down the up/down/left/right-direction scrolling button 27 of the input unit section 11, the time is measured that the up/down/left/right-direction scrolling button 27 is pushed down since the current contents were displayed. This time is set as a new automated scrolling speed value "V3'".

The new automated scrolling speed value "V3'" is compared with the conventional automated scrolling speed value "V3". When the new automated scrolling speed value "V3'" is within the alteration range of the automated scrolling speed value "V3", an average of the new automated scrolling speed value "V3'" and the automated scrolling speed value "V3" is calculated, and the automated scrolling speed value "V3" of the automated scrolling speed table is updated to its average value. When it is out of the alteration range, the automated scrolling speed value "V3" is not updated.

For example, in case that the user A's alteration range of the automated scrolling speed value is represented as $$0.5 \times V3 < x < 2.0 \times V3,$$

when the new scrolling speed value V3' is $$V3' = 1.5 \times V3,$$

an alteration process is performed for the automated scrolling speed value. In this case, when the new scrolling speed value V3' is $$V3' = 3.0 \times V3,$$

an alteration process is not performed for the automated scrolling speed value.

As with the user's reading speed, in addition to the relation that it is adversely proportional to the number of characters being displayed in one line, it also bears relation to whether or not a topic, in which the user is interested, is present in formation being displayed. That is, there is a tendency that the topic, in which the user is interested, is slowly read and reading of the topic, in which the user is not interested, is missed.

The information terminal 1 obtains the keyword from the contents that are accessed frequently, and the contents including its keyword are displayed by scrolling at the speed that the user set up. As a result, the information terminal can display the contents by scrolling, in which a user is interested, at a suitable speed.

Figure 15:
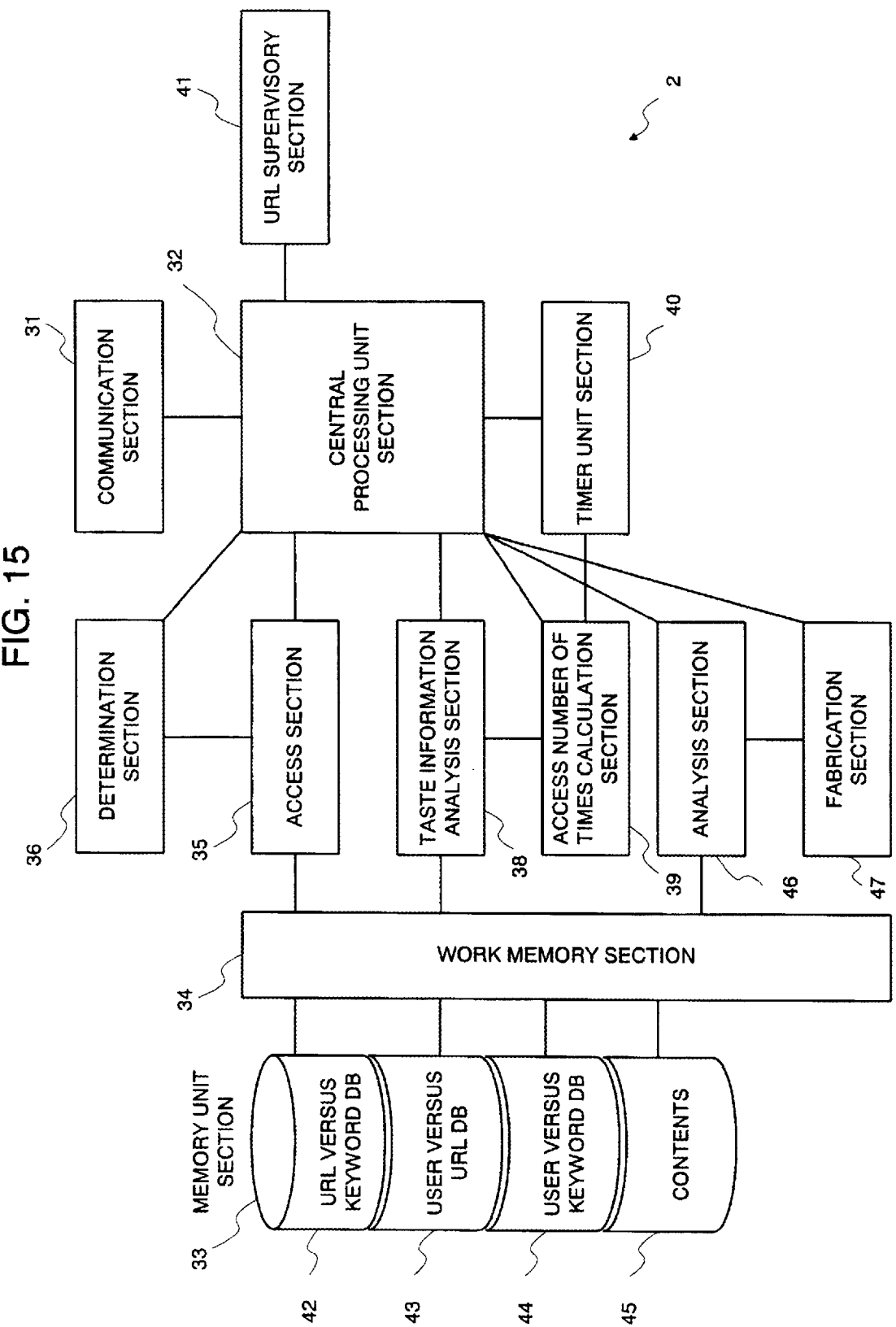
FIG. 15 is a block diagram illustrating a service provider 2 in another embodiment of an automated scrolling control system in accordance with the present invention.

In another embodiment of the automated scrolling control system in accordance with the present invention, the service provider transmits the contents together with the keyword to the information terminal. FIG. 15 illustrates the arrangement of the service provider 2. The service provider 2, as shown in FIG. 15, is arranged such that an analysis section 46 and a fabrication section 47 are further attached to the service provider 2 in the foregoing embodiment. The central processing unit 32 is further connected to the analysis section 46 and the fabrication section 47 via a bus.

The analysis section 46 reads out contents 45 recorded in the memory unit section 33, and determines whether or not the keyword is present within the contents 45. When it was determined that the keyword was present within the contents 45, the fabrication section 47 writes the keyword into a header portion of the contents 45. The memory unit section 33 further records a user versus keyword table 44 and the contents 45. The user versus keyword table 44 causes a user and the keyword to correspond.

Figure 16:
FIG. 16 is a table illustrating one example of a user versus keyword table 44.

FIG. 16 illustrates one example of the user versus keyword table 44. The user versus keyword table 44, as shown in FIG. 16, causes each user to correspond to the predetermined number of the keyword.

Figure 17:
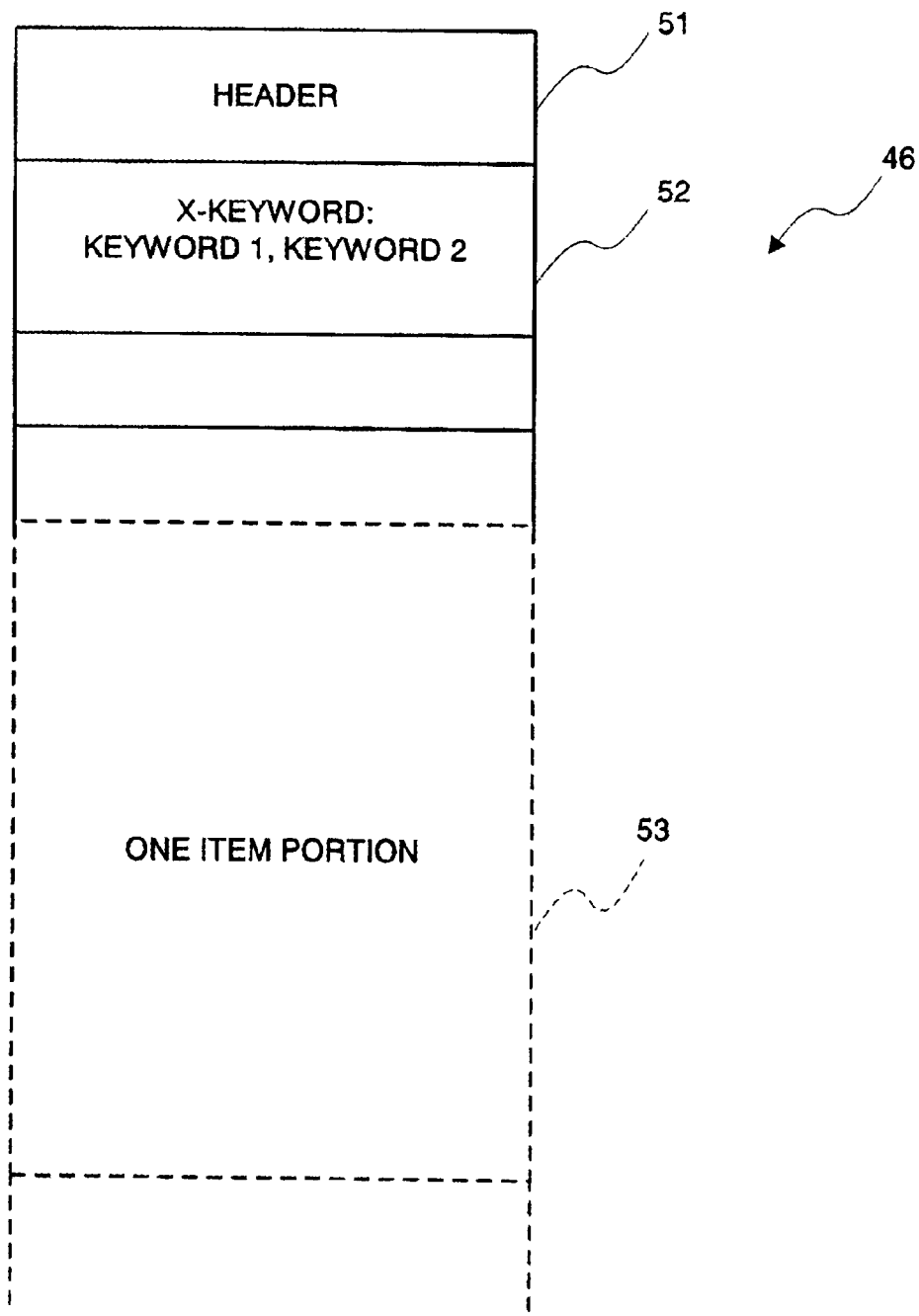
FIG. 17 is a conceptual diagram illustrating a data structure of contents.

FIG. 17 illustrates a data structure of the contents 45. The contents 45 are constructed of a header 51 and a contents body 53. Into the header 51 has been inserted a keyword's identifier 52. The keyword's identifier 52 includes the keyword that corresponded to the contents 45.

Figure 18:
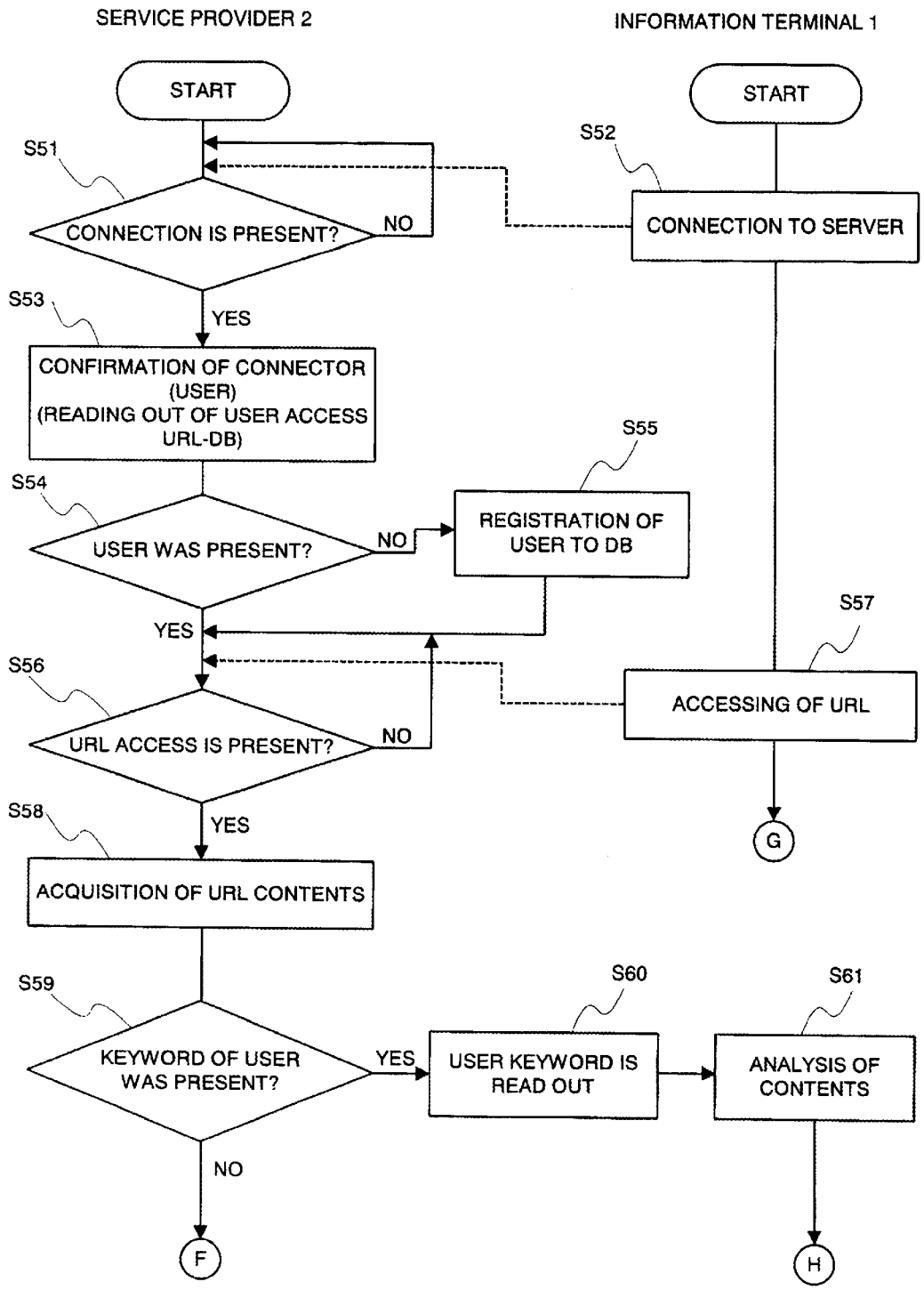
FIG. 18 is a flowchart illustrating an operation of an automated scrolling control system.
Figure 19:
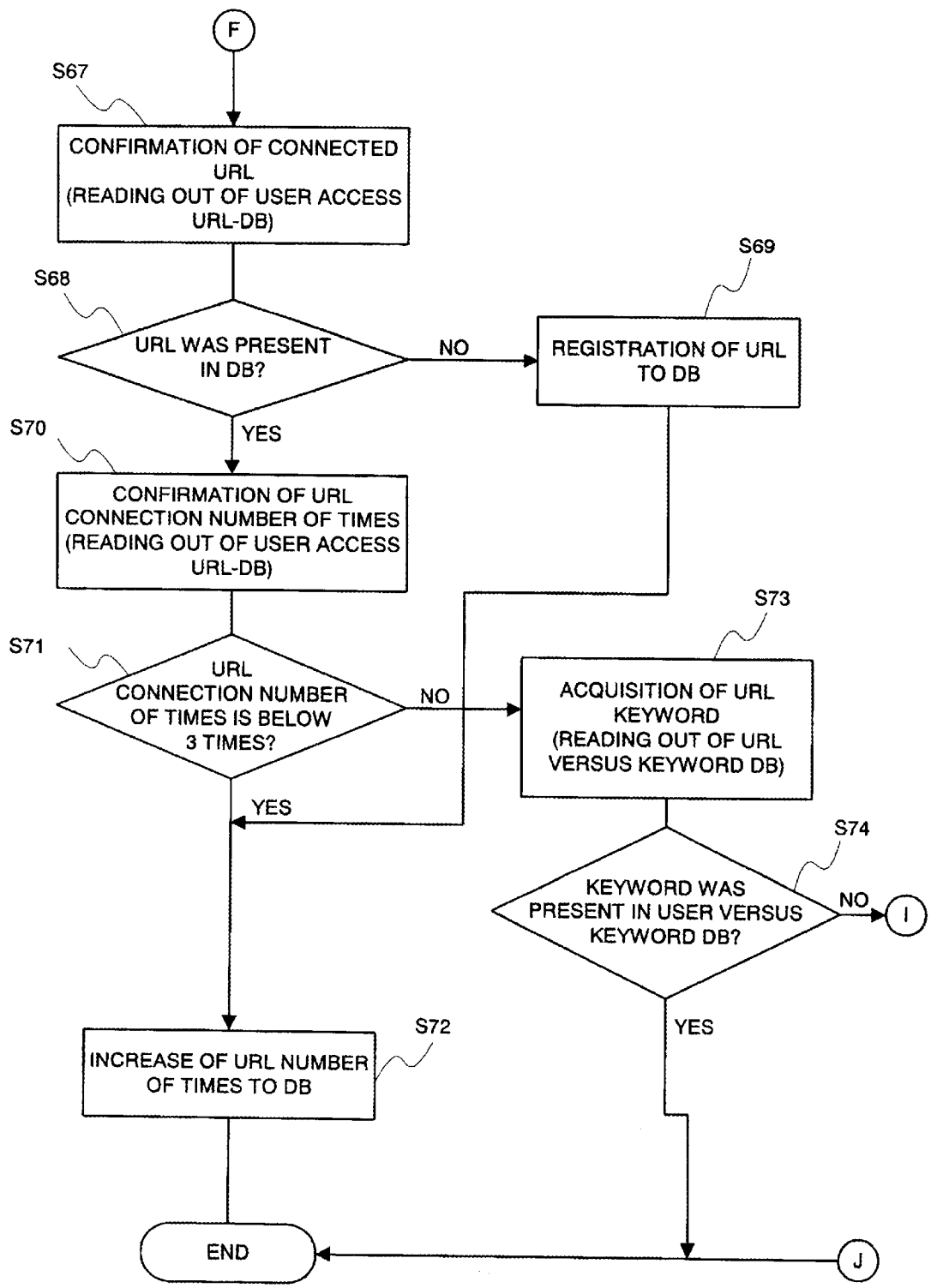
FIG. 19 is a flowchart illustrating an operation of an automated scrolling control system.
Figure 20:
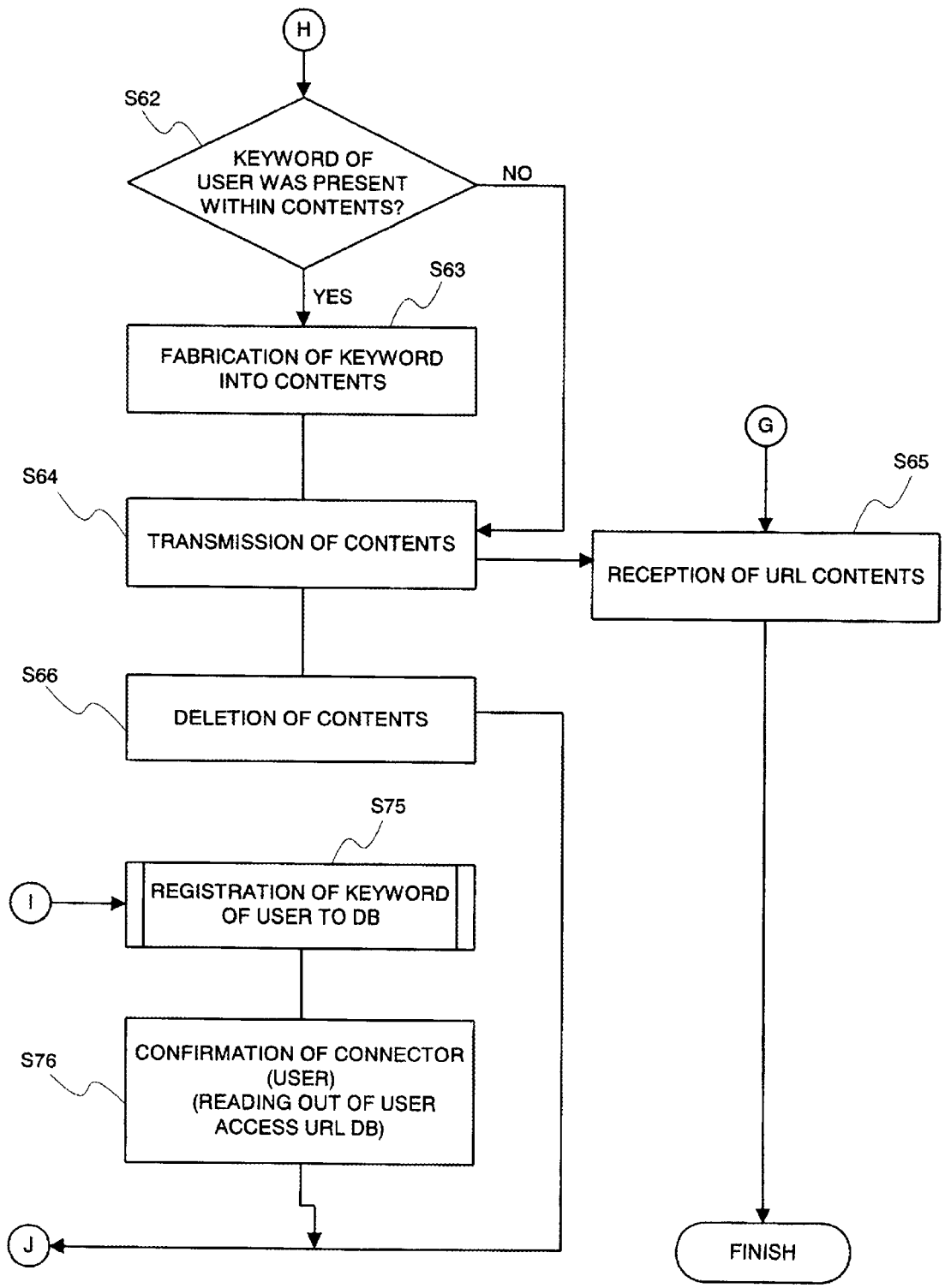
FIG. 20 is a flowchart illustrating an operation of an automated scrolling control system.

FIG. 18 to FIG. 20 illustrate the operation of the automated scrolling control system 10. At first, the service provider 2 determines via the communication section 31 whether or not the information terminal 1's connection request is present (step S51). When the information terminal 1's connection request is not present, the service provider 2 enters a loop in which is repeated the process of determining whether or not the information terminal 1's connection request is present. When the information terminal 1's connection request is received, the service provider 2 gets out of its loop to read out the user versus URL table 43 of the memory unit section 33 via the access section 35 (step S53).

Based on the user versus URL table 43, the determination section 36 determines whether or not information indicating the information terminal 1, which made the connection request, is present in the user versus URL table 43 (step S54). When information indicating the information terminal 1 is not present in the user versus URL table 43, information, which newly indicates the information terminal 1, is registered to the user versus URL table 43 (step S55). When information indicating the information terminal 1 is present in the user versus URL table 43, or after the step S55 was executed, the service provider 2 determines whether or not the information terminal 1 is making the keyword request, which is a special command, together with the URL request (step S56).

When the information terminal 1's URL access request is not present, the service provider 2 executes the loop in which is repeated the process (step S56) of determining whether or not the URL access request is present. When the service provider 2 received the URL access request and the keyword request from the information terminal 1, it gets out of its loop to obtain the URL contents from the contents server 3 via the URL supervisory section 41 and to record its URL contents in the memory unit section 33 (step S58).

It is determined whether or not information of the user who made the access request is present in the user versus keyword table 44 (step S59). When information of the user is present in the user versus keyword table 44, the access section 35 obtains the keyword that corresponds to its user (step S60). The analysis section 46 obtains the contents to be transmitted to the information terminal 1 (step S61), and determines whether or not the keyword is present within its contents (step S62).

When the keyword is present within the contents (step S62; YES), the fabrication section 47 inserts the keyword into the header portion of the contents (step S63), and transmits its contents to the information terminal 1 (step S64). When the keyword is not present within the contents, the contents are transmitted to the information terminal 1 as they are (step S64). After the contents were transmitted to the information terminal 1, the contents recorded in the memory unit section 33 are erased (step S66).

At this moment, the keyword listed in the user versus keyword table 44 accords with the keyword listed in the automated scrolling speed table 23 that the information terminal 1 possesses. By not transmitting to the information terminal 1 the keyword, which was not listed in the user versus keyword table 44, in such a manner, it becomes unnecessary for the information terminal 1 to retrieve the keyword from the contents.

When information of the user is not present in the user versus keyword table 44 (step S59; No), the contents are transmitted to the information terminal 1 as they are, and the determination section 36 instructs the access section 35 to read out the user versus URL table 43 (step S67). The determination section 36 determines whether or not the URL accessed from the information terminal 1 is present in the user versus URL table 43 (step S68).

When information of the URL accessed from the information terminal 1 is not present, the URL, which was accessed newly, is registered to the user versus URL table 43 (step S69). When information of the accessed URL is present, the access number of its URL is read out from the user versus URL table 43, and delivered to the determination section 36 (step S70).

The determination section 36 determines whether the access, of which the number of times is more than the predetermined number of times, is present during a predetermined period (step S71). When the access, of which the number of times is more than the predetermined number of times, is present, the taste information analysis section 38 obtains from the URL versus keyword table 42 the keyword that corresponds to the URL that the user requested (step S73). It is determined whether or not the obtained keyword is included in the keywords of the user versus keyword table 44, which correspond to the user (step S74).

When the obtained keyword is not included, its keyword is registered to the user versus keyword table 44 (step S75). A registration method is the same as the operation for registering the new keyword to the automated scrolling speed table 23 in the foregoing embodiment. That is, when the number of the keywords, which were registered to the user versus keyword table 44, is more than the predetermined number, the oldest keyword is erased, and the new keyword is registered. When the number of the registered keywords is below the predetermined number, the new keyword is registered as it is.

After registration of the new keyword, the taste information analysis section 38 erases information of the accessed URL and its access number from the user record of the user versus URL keyword table 43 (step S76).

When the access number is below the predetermined number, or after the process of the step 69 was performed, the access section 35 updates the user versus URL keyword table 43. Namely, to the access number of times of the accessed URL is added only one (step S72).

The information terminal 1, firstly, transmits the connection request to the service provider 2 (step S52), and transmits the URL access request to the service provider 2 (step S57). Then, the information terminal 1 receives the URL contents from the service provider 2 (step S65), and records its URL contents as the contents 24 in the memory unit section 15. The access section 17 determines whether or not the keyword's identifier has been inserted into the header portion of the contents 24. When the keyword has been inserted into the contents, the access section 17 obtains the inserted keyword, and the information terminal 1 performs the processes of the step 19 and the step 20 in the foregoing embodiment.

Figure 21:
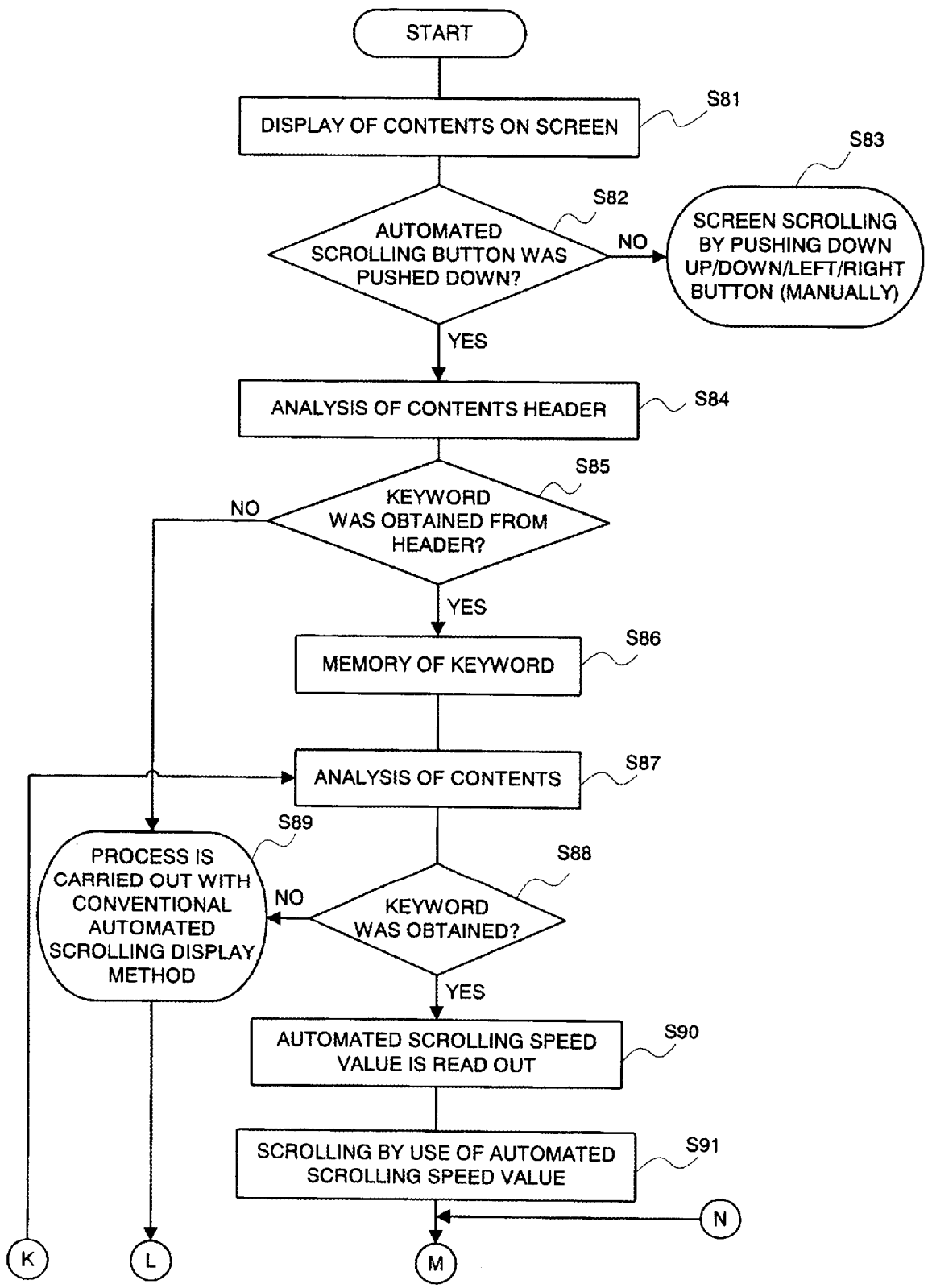
FIG. 21 is a flowchart illustrating an operation of an information terminal 1.
Figure 22:
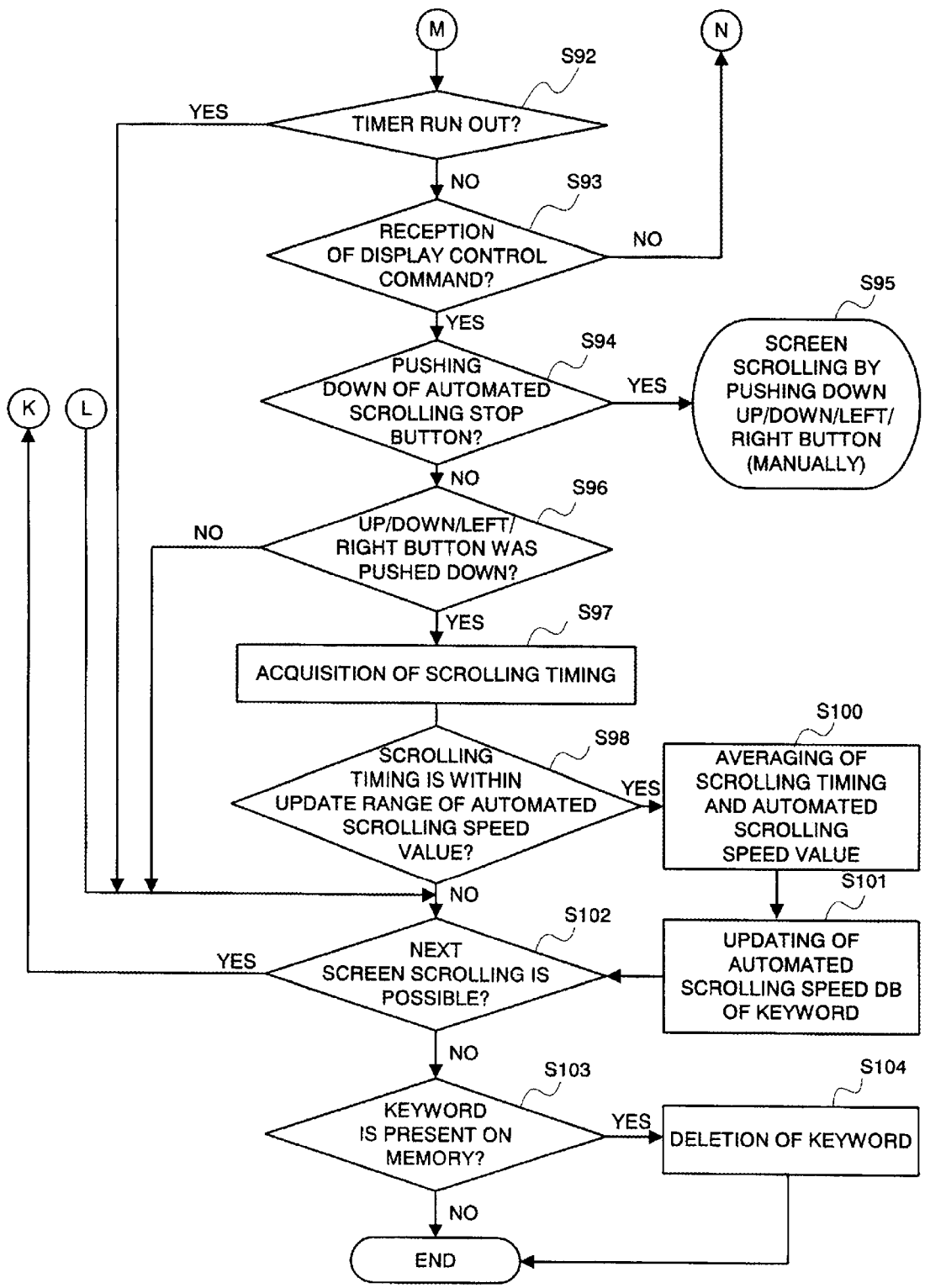
FIG. 22 is a flowchart illustrating an operation of an information terminal 1.
Figure 23:
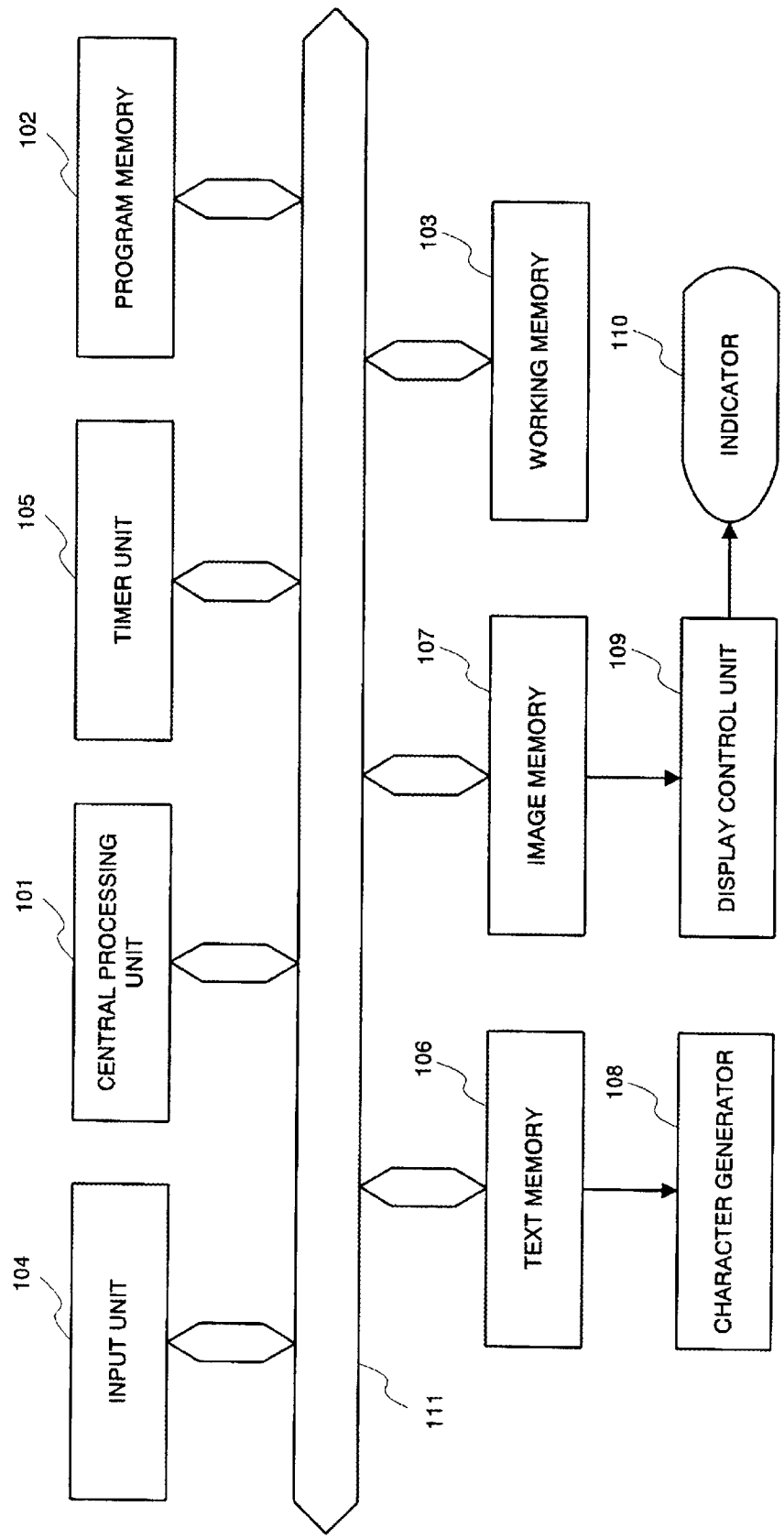
FIG. 23 is a block diagram illustrating an embodiment of a known scrolling control unit.

FIG. 21 and FIG. 22 illustrate the operation of displaying the contents by automated scrolling by information terminal 1. When a power of the information terminal 1 is switched on by the user, the information terminal 1 starts a predetermined application, and displays on the display unit section 22 the contents 24 recorded in the memory unit section 15 (step S81). Or, the information terminal 1 displays on the display unit section 22 the contents recorded in the record medium, which a memory and a hard disc attached to the outside exemplify.

When the remainder of the contents, which is not displayed in the display unit section 22, is present, namely, the page of the contents is more than two, the input supervisory section 12 determines whether or not the automated scrolling button 26 of the input unit section 11 is pushed down (step S82). When the page of the contents to be displayed is below two, the flow finishes.

When the automated scrolling button 26 of the input unit section 11 is not pushed down, by the user adjusting and pushing down the up/down/left/right-direction scrolling button 27 to the desired direction of the display screen 25, the contents are scrolled in the up/down directions or in the left/right directions of the display screen 25 (step S83).

When the user pushed down the automated scrolling button 26, the input supervisory unit 12 notifies the display control unit section 21 that the control command indicating execution of the automated scrolling was received. The display control unit section 21 starts the automated scrolling display process upon receiving its notification. The acquisition section 19 reads out the keyword from the header portion of the contents 24 (step S84), and determines whether or not the keyword is included in the header portion of the contents 24 (step S85).

When the keyword has been added to the header portion of the contents 24, the access section 17 obtains its keyword, and temporarily records it in the work memory 16 (step S86). When the keyword is not present in the header portion of the contents 24, based on character information, image information and so forth that are displayed on the display screen 25, the information terminal 1 performs the automated scrolling display process (step S89). For example, when the contents are character information, the scrolling is carried out at the speed adversely proportional to the character length of one line.

The display control unit section 21 instructs the access section 17 to read out the contents 24 recorded in the record unit section 15 and the keyword recorded in the automated scrolling speed table 23 (step S87). When the keyword is not present within the contents 24, based on character information, image information and so forth that are displayed on the display screen 25, the information terminal 1 performs the known automated scrolling display process (step S89).

When the keyword is present within the contents 24, the display control unit section 21 obtains the automated scrolling speed value that corresponds to the keyword of the automated scrolling speed table 23 via the central processing unit section 13 and the access section 17 (step S90). The display control unit section 21 notifies the display unit section 22 so as to display the contents 24 on the display screen 25, and notifies of the automated scrolling speed value (step S91). The display unit section 22 receives the automated scrolling speed value, and displays the contents 24 by automated scrolling. The central processing unit section 13 instructs the timer unit section 20 to measure the time that corresponds to the automated scrolling speed value.

The timer unit section 20 measures the time by the central processing unit section 13's instruction (step S92). When the contents are being displayed by automated scrolling on the display unit section 22, the display control unit section 21 notifies the input supervisory unit 12 to determine whether or not the act of pushing down the automated scrolling button 26 of the input unit section 11 is present. The input supervisory unit 12 determines whether or not the display command is received from the user within the time of the automated scrolling display of the contents (step S93). Until the display time runs out, that is, until the timer unit section 20 outputs the time-up signal to the central processing unit section 13, the process is repeatedly performed of determining whether or not the display control command is received.

When the display control command was received, it is determined whether the pushed-down button is the automated scrolling button 26 or the up/down/left/right-direction scrolling button 27 (step S94 and S96). The display control unit section 21 is notified of the determination result.

When the automated scrolling button 26 was pushed down, the display control unit section 21 makes the automated scrolling display process finished, and by the user adjusting and pushing down the up/down/left/right-direction scrolling button 27 to the desired direction of the display screen 25, the contents is scrolled in the up/down directions or in the left/right directions of the display screen 25 (step S95).

When the up/down/left/right-direction scrolling button 27 was pushed down, the display control unit section 21 requests the timer unit section 20 via the central processing unit section 13 of the time that the up/down/left/right-direction scrolling button 27 is pushed down since the contents was displayed on the display screen 25. This time is set as a new scrolling speed value. The timer unit 20 notifies the display control unit section 21 of the new scrolling speed value (step S97). The display control unit section 21 delivers the new scrolling speed value to the comparison section 18 via the central processing unit section 13, and instructs a comparison between the conventional automated scrolling speed value and the new automated scrolling speed value (step S98).

When the new automated scrolling speed value is within the alteration range of the automated scrolling speed value, the comparison section 18 calculates an average of the new automated scrolling speed value and the automated scrolling speed value (step S100) and notifies the display control unit section 21 of the average. The display control unit section 21 inserts the average as the new automated scrolling speed value, and updates the automated scrolling speed value, which corresponds to the keyword within the automated scrolling speed table, to the new automated scrolling speed value (step S101).

The acquisition section 19 reads out the contents 24 stored in the record unit section 15, and determines whether or not the remainder of the contents to be displayed on the display screen 25 is present (step S102). The display control unit section 21 is notified of this determination result. When the remainder of the contents to be displayed is present, the step S87 is executed once again, and the display control unit section 21 performs the display process for the remainder of the contents on the display screen 25. When the remainder of the contents to be displayed is not present, the display control unit section 21 makes the automated scrolling display process finished.

When the timer unit section 20 output the time-up signal to the central processing unit section 13 (step S92; NO), the display control unit section 21 instructs the acquisition section 19 to determine whether or not the remainder of the contents, which are displayed on the next display screen 25, is present. The acquisition section 19 reads out the contents 24 stored in the record unit section 15, and determines whether or not the remainder of the contents to be displayed on the display screen 25 is present (step S102). The display control unit section 21 is notified of the determination result. When the remainder of the contents to be displayed is present, the step S34 is executed once again, and the display control unit section 21 performs the display process for its remainder of the contents on the display screen 25.

When the remainder of the contents to be displayed is not present, the display control unit section 21 determines whether or not the keyword has been recorded in the work memory 16 (step S103). When the keyword has been recorded, the display control unit section 21 erases its keyword via the access section 17 (step S104).

The automated scrolling control unit and the automated scrolling control system in accordance with the present invention can automatically adjust the scrolling speed to the speed at which the user can read easily in case of automatically displaying the contents by scrolling.

The entire disclosure of Japanese Patent Application No. 2000-271841 filed on Sep. 7, 2000 including specification, claims, drawings and summary are incorporated herein by reference in its entirety.

What is claimed is:

1. An automated scrolling control unit, comprising:
    a table section in which a keyword and a corresponding scrolling speed are stored;
    an acquisition section that retrieves said keyword from a header portion of content to be displayed; and
    a display section that retrieves from said table section said scrolling speed that corresponds to said keyword retrieved by said acquisition section, and displays said content by scrolling at said corresponding scrolling speed.

2. An automated scrolling control unit comprising:
    a table section in which a keyword and a corresponding scrolling speed are stored;
    an acquisition section that retrieves said keyword from content;

a display section that retrieves from said table section said scrolling speed that corresponds to said keyword retrieved by said acquisition section, and displays said content by scrolling at said corresponding scrolling speed; and a display control section that, updates said table section when said scrolling speed is altered by a user during displaying of said content by scrolling.

3. The automated scrolling control unit according to claim 1, wherein, when said keyword is not included in said content, said display section displays said content by scrolling at a scrolling speed that is set up based on a number of characters being displayed on said display section.

4. An automated scrolling control system, comprising:

an information terminal; and a server that provides content to said information terminal, said server comprising a first table in which said content and a corresponding keyword are stored and, based on said first table, said server provides said keyword that corresponds to said content to said information terminal, said information terminal comprising:

a second table section that includes said keyword provided from said server and a corresponding scrolling speed;

an acquisition section that retrieves said keyword from said content; and a display section that displays said content by scrolling at said scrolling speed that corresponds to said retrieved keyword.

5. The automated scrolling control system according to claim 4, wherein said server further comprises a third table section that indicates a number of times in which said information terminal requested said content, and wherein, when said number of times is below a predetermined number of times, said server does not provide said keyword to said information terminal.

6. The automated scrolling control system according to claim 4, wherein said server further comprises a fabrication section that adds said keyword to said content, and provides said content to which said keyword was added to said information terminal.

7. The automated scrolling control system according to claim 4, wherein said server further comprises a fourth table that includes a reference to said information terminal and said keyword from said second table corresponding to said information terminal, and wherein when said keyword is not present in said fourth table, said server does not provide said keyword to said information terminal.

8. An automated scrolling control method, comprising:

retrieving a keyword from a header portion of content; and retrieving a scrolling speed, which corresponds to said retrieved keyword, from a table in which said keyword and a said scrolling speed are stored so as to display said content by scrolling at this said scrolling speed.

9. An automated scrolling control method comprising:

retrieving a keyword from a header portion of content;

retrieving a scrolling speed, which corresponds to said retrieved keyword, from a table in which said keyword and said scrolling speed are stored so as to display said content by scrolling at said scrolling speed; and updating said table when a scrolling speed is altered by a user during said display of said content.

10. The automated scrolling control method according to claim 8, further comprising displaying said content by scrolling at a scrolling speed based on a number of characters being displayed when said keyword is not included in said content.

* * * * *